US010657825B2

(12) United States Patent
Oshida et al.

(10) Patent No.: US 10,657,825 B2
(45) Date of Patent: May 19, 2020

(54) VEHICLE OPERATION ASSISTANCE

(71) Applicant: Honda Motor Co., Ltd., Tokyo (JP)

(72) Inventors: Kei Oshida, Ustunomiya (JP); Xue Bai, Novi, MI (US); Shigenobu Saigusa, West Bloomfield, MI (US); Yoichi Sugimoto, Tochigi (JP); Samir K. Al-Stouhi, Dearborn, MI (US)

(73) Assignee: Honda Motor Co., Ltd., Tokyo (JP)

( * ) Notice: Subject to any disclaimer, the term of this patent is extended or adjusted under 35 U.S.C. 154(b) by 28 days.

(21) Appl. No.: 15/973,687

(22) Filed: May 8, 2018

(65) Prior Publication Data

US 2018/0253977 A1 Sep. 6, 2018

Related U.S. Application Data

(63) Continuation of application No. 14/844,124, filed on Sep. 3, 2015, now Pat. No. 9,997,077.

(60) Provisional application No. 62/045,887, filed on Sep. 4, 2014.

(51) Int. Cl.
| | |
|---|---|
| *B60W 30/165* | (2020.01) |
| *G08G 1/00* | (2006.01) |
| *G05D 1/02* | (2020.01) |
| *G01C 21/34* | (2006.01) |

(52) U.S. Cl.
CPC ............ *G08G 1/22* (2013.01); *B60W 30/165* (2013.01); *G05D 1/0295* (2013.01); *G01C 21/3407* (2013.01); *G05D 2201/0213* (2013.01)

(58) Field of Classification Search
None
See application file for complete search history.

(56) References Cited

U.S. PATENT DOCUMENTS

| | | | |
|---|---|---|---|
| 2003/0182183 A1* | 9/2003 | Pribe | G06Q 10/06 705/13 |
| 2010/0256836 A1* | 10/2010 | Mudalige | G08G 1/163 701/2 |
| 2013/0041576 A1* | 2/2013 | Switkes | G08G 1/166 701/123 |
| 2013/0179024 A1* | 7/2013 | Nordbruch | A61B 5/18 701/23 |
| 2013/0226408 A1* | 8/2013 | Fung | B60W 40/09 701/41 |

(Continued)

Primary Examiner — John Olszewski
Assistant Examiner — Gerrad A Foster
(74) Attorney, Agent, or Firm — Rankin, Hill & Clark LLP

(57) ABSTRACT

Embodiments, systems, and techniques for vehicle operation assistance are provided herein. Vehicle operation assistance may be provided by monitoring characteristics of an occupant of a vehicle and determining an emergency status for the occupant based on characteristics of the occupant, transmitting a request for help based on the emergency status indicating the occupant of the vehicle is experiencing an emergency, receiving a "follow me" request from a potential leader vehicle, enabling follower mode such that vehicle is a follower vehicle and the potential leader vehicle is a leader vehicle, establishing a connection with the leader vehicle and receiving navigation instructions from the leader vehicle based on the vehicle being in follower mode, generating driving action commands based on navigation instructions, and executing respective driving action commands in an autonomous fashion based on the vehicle being in follower mode.

18 Claims, 8 Drawing Sheets

(56) References Cited

U.S. PATENT DOCUMENTS

2015/0243172 A1* 8/2015 Eskilson .............. A61B 5/18
701/1

* cited by examiner

VEHICLE OPERATION ASSISTANCE

CROSS-REFERENCE TO RELATED APPLICATIONS

This application is a continuation of and claims priority to pending U.S. Non-Provisional patent application, Ser. No. 14/844,124 entitled "VEHICLE OPERATION ASSISTANCE", filed on Sep. 3, 2015 which claims the benefit of U.S. Provisional Patent Application, Ser. No. 62/045,887 entitled "VEHICLE SYSTEMS AND METHODS OF USING THE SYSTEMS", filed on Sep. 4, 2014; the entirety of the above-noted application(s) are incorporated by reference herein.

BACKGROUND

Drivers, passengers, or other occupants of a vehicle or automobile may experience emergencies, such as a medical emergency or suffer from effects of a medical condition while driving or operating a vehicle. Such medical conditions may prevent the driver of the vehicle from operating the vehicle effectively, performing a driving task or driving operation, or reacting in time to a road hazard. As a result, the driver may pose a risk to him or herself and/or cause an inconvenience or create a dangerous scenario for surrounding traffic or other bystanders, such as pedestrians.

BRIEF DESCRIPTION

According to one or more aspects, a system for vehicle operation assistance may include a monitoring component, a communication component, and an assist component. The monitoring component may monitor one or more characteristics of an occupant of a vehicle and determining an emergency status for the occupant based on one or more of the characteristics of the occupant. The communication component may transmit a request for help based on the emergency status indicating the occupant of the vehicle is experiencing an emergency and receive a "follow me" request from a potential leader vehicle. The assist component may place the system in follower mode (or enable follower mode) such that vehicle is a follower vehicle and the potential leader vehicle is a leader vehicle. The communication component, when in follower mode, may establish a connection with the leader vehicle and receives one or more navigation instructions from the leader vehicle. The assist component, when in follower mode, may generate one or more driving action commands based on one or more of the navigation instructions and execute respective driving action commands in an autonomous fashion.

According to one or more aspects, a method for vehicle operation assistance may include monitoring one or more characteristics of an occupant of a vehicle and determining an emergency status for the occupant based on one or more of the characteristics of the occupant, transmitting a request for help based on the emergency status indicating the occupant of the vehicle is experiencing an emergency, receiving a "follow me" request from a potential leader vehicle, enabling follower mode such that vehicle is a follower vehicle and the potential leader vehicle is a leader vehicle, establishing a connection with the leader vehicle and receiving one or more navigation instructions from the leader vehicle based on the vehicle being in follower mode, and generating one or more driving action commands based on one or more of the navigation instructions and executing respective driving action commands in an autonomous fashion based on the vehicle being in follower mode.

The method may include monitoring one or more operating actions of the occupant of the vehicle and determining the emergency status based on one or more of the operating actions. The method may include enabling a normal mode or an emergency mode based on actuation of a cancel follower mode button or a proximity of the vehicle to a destination. The method may include transmitting one or more navigation instructions from the leader vehicle to a help center, receiving an intent status from the help center based on one or more of the navigation instructions, and cancelling follower mode based on the intent status indicating malicious intent of a driver of the leader vehicle. The method may include receiving one or more images of one or more hazards and associated lane level locations for respective reported hazards and rendering one or more of the images based on a distance from the vehicle to one or more of the lane level locations for respective reported hazards.

According to one or more aspects, a method for vehicle operation assistance may include receiving a request for help based on an emergency status indicating an occupant of a potential follower vehicle is experiencing an emergency, transmitting a "follow me" request, placing a potential leader vehicle in leader mode such that the potential leader vehicle is a leader vehicle and the potential follower vehicle is a follower vehicle based on a response to the "follow me" request, establishing a connection with the follower vehicle, transmitting one or more navigation instructions to the follower vehicle.

DETAILED DESCRIPTION

Figure 1:
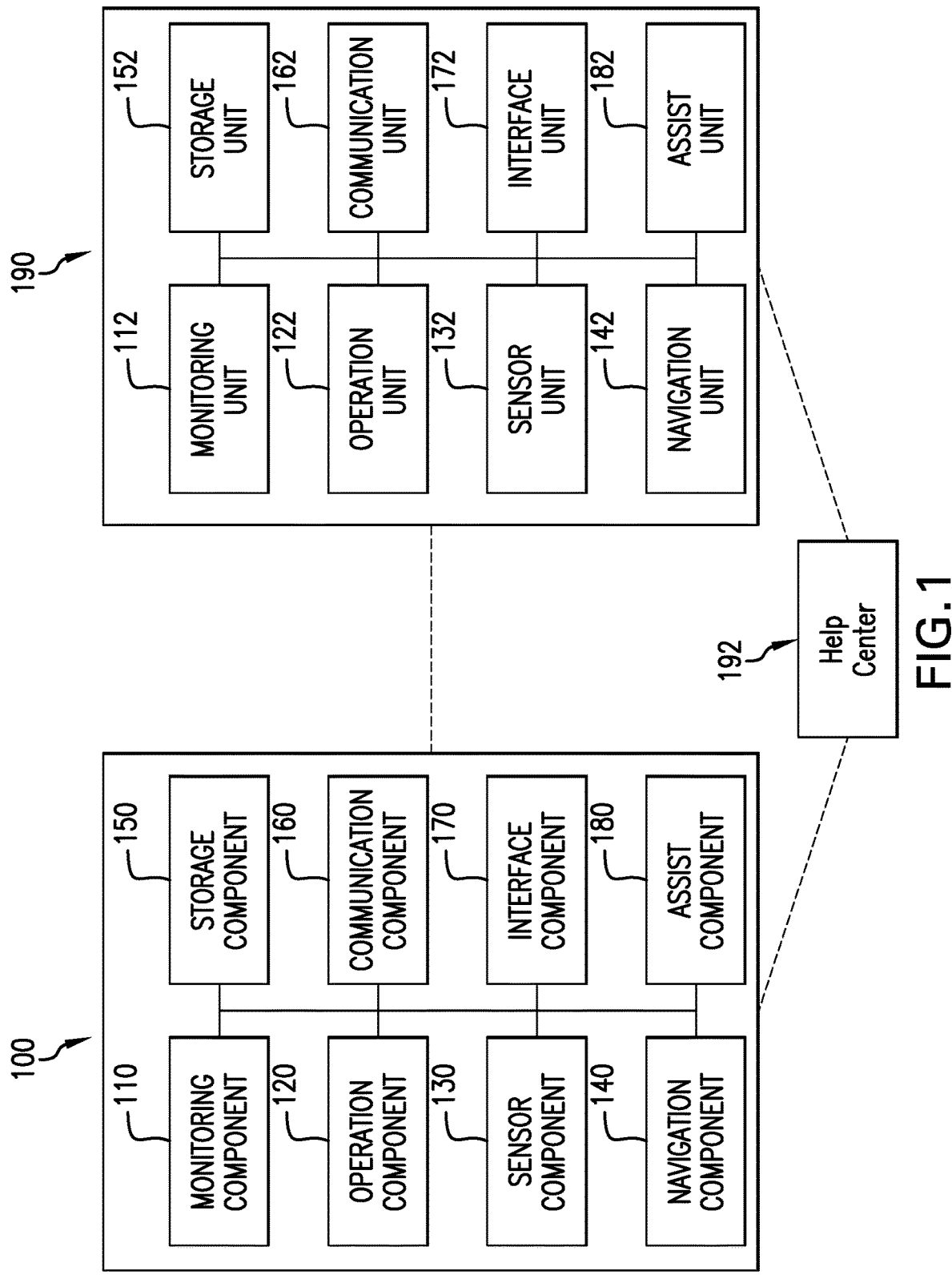
FIG. 1 is an illustration of an example component diagram of a system for vehicle operation assistance, according to one or more embodiments.

Embodiments or examples, illustrated in the drawings are disclosed below using specific language. It will nevertheless be understood that the embodiments or examples are not intended to be limiting. Any alterations and modifications in the disclosed embodiments, and any further applications of the principles disclosed in this document are contemplated as would normally occur to one of ordinary skill in the pertinent art.

The following terms are used throughout the disclosure, the definitions of which are provided herein to assist in understanding one or more aspects of the disclosure.

As used herein, the term occupant may include a driver, passenger, user, or operator of a vehicle or automobile. An emergency may include one or more different scenarios, such as a medical emergency, a medical condition, etc. An operating environment may include one or more roadways, one or more road segments, one or more other vehicles, one or more objects, which may be hazards or hazard objects. As used herein, the term "hazard" may include obstacles, obstructions, objects in the roadway, such as other vehicles, animals, construction, debris, potholes, traffic barrels, traffic cones, etc. As used herein, a vehicle generally refers to or means a vehicle which is equipped with a system for vehicle operation assistance, while other vehicles may or may not necessarily be equipped with system for vehicle operation assistance.

As used herein, an emergency response vehicle may include leader vehicles, emergency response, such as police, ambulance, firefighters, first aid, volunteer responders, registered responders, subscribers or members of a private or trusted network, etc.

As used herein, a leader vehicle may be a responsible vehicle (RV), host vehicle or host, preceding vehicle, a first vehicle of multiple vehicles or a group of vehicles, control vehicle, or assistance providing vehicle. As used herein, a follower vehicle may be a virtually hitched vehicle (HV), following vehicle, a second vehicle of multiple vehicles or a group of vehicles, compliant vehicle, assistance receiving vehicle. A follower vehicle may 'tail' a leader vehicle in a manner as if the follower vehicle were 'hitched' or virtually hitched to the leader vehicle. However, the 'length' of the virtual hitch may generally vary due to driving conditions, obstacles, objects, etc. In one or more embodiments, leader vehicles may be pre-paired with follower vehicles, such as when a group or caravan of vehicles is travelling together.

As used herein, operating actions may include driving actions, turn signal operations, steering operations, braking operations, acceleration operations, horn operations, etc. Further, these terms may be used interchangeably throughout the disclosure.

As used herein, the term "infer" or "inference" generally refer to the process of reasoning about or inferring states of a system, a component, an environment, a user from one or more observations captured via events or data, etc. Inference may be employed to identify a context or an action or may be employed to generate a probability distribution over states, for example. An inference may be probabilistic. For example, computation of a probability distribution over states of interest based on a consideration of data or events. Inference may also refer to techniques employed for composing higher-level events from a set of events or data. Such inference may result in the construction of new events or new actions from a set of observed events or stored event data, whether or not the events are correlated in close temporal proximity, and whether the events and data come from one or several event and data sources.

One or more systems and techniques for providing vehicle operation assistance to an occupant of a vehicle are provided herein. For example, vehicle operation assistance may include emergency assistance to an occupant of a vehicle experiencing an emergency, such as a medical condition (e.g., heart attack, stroke, etc.). A system for vehicle operation assistance may cause a vehicle to pull over, slow down, or stop in response to detecting an emergency. Further, the system for vehicle operation assistance may initiate contact with a help center, automatically request an emergency vehicle to meet the vehicle associated with the emergency (e.g., referred to as a follower vehicle), send a leader vehicle to meet up, virtually link, or 'wirelessly tow' the vehicle to a location, or monitor such 'wireless towing' and provide appropriate or corresponding responses in a variety of scenarios. The leader vehicle or driver of the leader vehicle may thus be empowered to provide assistance to occupants of the follower vehicle. In this way, vehicle operation assistance may be provided for occupants of a vehicle experiencing an emergency, who need flat tire help, have lost their way, have requested direction assistance, etc.

Further, one or more systems and techniques for providing hazard detection or object avoidance are provided herein. For example, when a first vehicle detects an object or obstacle, the first vehicle may capture an image or media of the object. This image may be transmitted (e.g., directly or indirectly) to a second vehicle (e.g., in the form of a warning, a notification, or a precaution) as the second vehicle approaches or comes within a threshold distance of the object. The second vehicle may display the image of the object and take corrective driving actions, operating actions, or provide operation assistance accordingly. Examples of operation assistance may include providing an automatic lane change operating action, providing an object notification or displaying an image or media of an object, etc. In this way, the operation assistance may facilitate mitigation of traffic congestion frequently caused by objects in the roadway.

The second vehicle may cross-reference or double check the existence or the location of the object. If the object is no longer detected in the roadway by the second vehicle, or if a threshold number of vehicles confirm the absence of the object, further warnings, notifications, or precautions with regard to that object may be discontinued. For example, if the object and corresponding location is stored to a database of road hazard objects, the object may be removed from the database as a result of one or more other vehicles confirming that no object was detected at the corresponding (e.g., real world or operating environment) location for that object.

FIG. 1 is an illustration of an example component diagram of a system 100 for vehicle operation assistance, according to one or more embodiments. The system 100 for vehicle operation assistance may include a monitoring component 110, an operation component 120, a sensor component 130, a navigation component 140, a storage component 150, a communication component 160, an interface component 170, and an assist component 180.

The system 100 for vehicle operation assistance may interact with or communicate with one or more other systems, such as another system for vehicle operation assistance. In one or more embodiments, this may be system 190. In other embodiments, system 190 may not necessarily be a system for vehicle operation assistance. Regardless, in this example, system 190 may include a monitoring unit 112, an operation unit 122, a sensor unit 132, a navigation unit 142, a storage unit 152, a communication unit 162, an interface unit 172, and an assist unit 182.

Further, the communication component 160 of the system 100 for vehicle operation assistance may facilitate communications with a help center, such as help center 192. According to one or more aspects, the system 100 for vehicle operation assistance may be equipped on a second vehicle and the system 190 may be equipped on a first vehicle. As an example, the first vehicle may be a leader vehicle or a potential leader vehicle and the second vehicle may be a follower vehicle, a potential follower vehicle, or a vehicle requesting assistance. Further, the system 100, the system 190, and the help center 192 may communicate directly or indirectly with one another (e.g., where one or more of the system 100, the system 190, and the help center 192 may act as an intermediary for communications in different scenarios).

The monitoring component 110 may monitor one or more occupants of a vehicle, such as a driver of a vehicle, for one or more vital signs or characteristics, thereby assessing the health or awareness of the driver. For example, the monitoring component 110 may measure a body temperature, a pulse, a pulse rate or heart rate, a respiration rate, perspiration rate, a blood pressure, eye movement, body movement, head movement, carbon dioxide output, or other biometric or functional aspects of a driver of a vehicle. Based on these measurements or readings, the monitoring component 110 may determine whether an occupant of a vehicle is experiencing an emergency (e.g., an emergency status), and thus requires assistance.

For example, if the heart rate monitor of the monitoring component 110 receives a heart rate or pulse rate reading which is outside of a predetermined or predefined window, the monitoring component 110 may determine that that occupant is experiencing a heart attack. Other ranges, windows, or thresholds for other readings or measurements may be used to characterize, identify, or define an 'emergency' in a similar manner. As another example, the monitoring component 110 may determine that a driver of a vehicle has fallen asleep when no eye movement is detected (e.g., due to the eyes of the driver being closed). In yet another example, the monitoring component 110 may determine an operational inability of a driver when a sensor component 130 of a vehicle identifies or detects an object or obstacle (e.g., such as an object located in a collision path of a vehicle) and the driver fails to react or take corrective driving action within a predetermined time threshold. In other words, if a driver is in a scenario where it would be expected that the driver would navigate around an obstruction identified by the vehicle, but does not do so within a threshold time frame, the monitoring component 110 may determine that the driver is experiencing an emergency, drowsiness, sleepiness, operational inability, a medical condition, etc.

Explained in greater detail, and embodied in an example, if the sensor component 130 of the vehicle detects an object, such as a deer or other animal in the middle of the roadway, the vehicle is on a direct collision course with the animal, and the driver of the vehicle does not react according to one or more predefined user initiated operating actions (e.g., swerving to avoid the animal, braking to slow or stop the vehicle, utter an audible response, such as "Oh no!", etc.), the monitoring component 110 or the operation component 120 may determine inattentiveness, and thus an emergency. In these or similar scenarios, the monitoring component 110 may determine that an emergency scenario is occurring or that the driver of the vehicle is experiencing an emergency.

In this way, the monitoring component 110 may determine when an occupant of a vehicle is experiencing an emergency or medical emergency and when to initiate a request for help with a help center 192, transmission of a distress signal, or provide operation assistance, such as an automatic pull over, stop, or slow down operation.

Further, the monitoring component 110 may determine a level of emergency associated with an emergency based on a likelihood of survival, whether the emergency is life threatening, etc. The level of emergency may be indicative of the urgency of a scenario or a state of an emergency or a level of emergency response or help to be requested.

The monitoring component 110 may include one or more sensors, such as a temperature sensor, a heart rate sensor, pulse sensor, a breathing sensor, an in-vehicle image capture component, a biometric sensor, etc.

In one or more embodiments, the operation component 120 may monitor one or more operating actions of one or more occupants of a vehicle, such as a driver of a vehicle. For example, the operation component 120 may monitor operating actions such as driving actions, turn signal operations, steering operations, braking operations, acceleration operations, horn operations, etc. Based on this monitoring, the operation component 120 may determine whether an occupant of a vehicle is experiencing an emergency, and thus requires assistance. For example, if a driver of a vehicle becomes unresponsive, no operating actions may be detected over an extended period of time. Accordingly, the operation component 120 may determine an emergency based on an absence of operating actions, steering input, etc. from the driver over a predetermined period of time.

In one or more embodiments, an interface component 170 may include an emergency button which a driver of a vehicle may utilize to manually inform a help center 192 that he or she requires assistance due to an emergency or that an emergency scenario has occurred. As an example, a first press of the emergency button of the interface component 170 may initiate a request for help, transmission of a distress signal, or changing of an emergency status, while a second press of the emergency button may cause the request for help or distress signal to be cancelled. In this way, the interface component 170 may have one or more buttons which may be utilized to toggle a request for help or an emergency distress signal, for example.

Accordingly, one or more different components of a system 100 for vehicle operation assistance may determine or assess whether a driver or occupant of a vehicle is experiencing an emergency. In one or more embodiments, the monitoring component 110 may generate an emergency determination based on readings from one or more sensors, inputs provided to the operation component 120 (e.g., from the driver of the vehicle), or the emergency button of the interface component 170. Accordingly, it can be seen that the emergency determination may be generated based on a single input or a combination of inputs (e.g., from the monitoring component 110, sensor component 130, interface component 170, operation component 120, etc.) indicative of when a driver is incapacitated, such as due to health, vision, hearing, awareness, or vital sign issues.

The operation component 120 may receive indication of use of one or more steering inputs from a driver of a vehicle, such as a steering wheel, automobile or vehicle pedals, such as a brake pedal, clutch pedal, throttle, accelerator, or gas pedal, etc. In other words, the operation component 120 may receive one or more operating actions from the driver of a vehicle. The operation component 120 may monitor other components, such as cruise control systems or sub-systems, an autonomous cruise control (ACC) system, adaptive cruise control, radar cruise control, turn signal indicators, etc.

The sensor component 130 may detect or identify one or more objects, obstacles, hazards, or road hazards and associated or corresponding attributes or characteristics. For example, the sensor component 130 may detect an object, a speed of the object, a distance of the object from the vehicle, a bearing or direction of travel of the object, a size of the object, a position or a location associated with the object, such as a lane location, etc.

In one or more embodiments, the sensor component 130 may identify white lines and hard shoulders of a roadway or road segment to facilitate lane recognition. Further, the sensor component 130 may identify or classify an object as another vehicle, a pedestrian, a cyclist, debris, a pothole, etc. The sensor component 130 may include one or more radar units, image capture components, sensors, cameras, gyroscopes, accelerometers, scanners (e.g., 2-D scanners or 3-D scanners), or other measurement components.

The navigation component 140 may include a global positioning system (GPS) unit and may detect a location or current location of a vehicle or determine a navigation route along one or more road segments for the vehicle.

The storage component 150 may store a location history of a vehicle, such as when a vehicle travels along a proposed navigation route, for example. Additionally, the storage component 150 may store one or more images of objects or obstacles captured by a sensor component 130 of a vehicle or one or more images of objects captured by a sensor component 130 of another vehicle.

The communication component 160 may facilitate communication between one or more components or sub-components of the system 100 for vehicle operation assistance, vehicle to vehicle (V2V) communications, vehicle to help center 192 communications, etc. For example, readings or information may be communicated or transmitted using a controller area network (CAN) of a vehicle.

In this regard, the communication component 160 may submit a request for help or a help request when one or more other components determines that the driver of the vehicle or another occupant is experiencing an emergency, such as a medical emergency, for example. In one or more embodiments, the communication component 160 may initiate communications with a help center 192, which may facilitate or determine one or more emergency response actions. In other embodiments, the assist component 180 of the system 100 for vehicle operation assistance may generate one or more emergency response actions. In yet other embodiments, the communication component 160 and the assist component 180 may receive or generate a set of collective emergency response actions in concert or in conjunction with one another.

Examples of emergency response actions may include automatically pulling the vehicle over or stopping at a 'safe' area or location via one or more automated driving actions, automatically turning on or engaging hazard lights or 'blinkers' of a vehicle, automatically navigating via one or more automated driving actions, requesting 'wireless towing' from a leader vehicle, automatically navigating to meet a leader vehicle via one or more automated driving actions, performing object, obstacle, or hazard detection, mitigation, avoidance, etc.

The communication component 160 may transmit a help request, a request for an emergency vehicle, a request for medical emergency assistance, a request for wireless towing or a leader vehicle, status information, such as vital signs of the driver, vehicle status, vehicle location, vehicle mode, etc. The communication component 160 may transmit or receive one or more autonomous or automated operating actions from a leader vehicle or another vehicle equipped with another system, such as a system 100 for vehicle operation assistance. In one or more embodiments, a vehicle equipped with a system 100 for vehicle operation assistance may receive one or more autonomous or automated operating actions from another vehicle which is not necessarily equipped with a system 100 for vehicle operation assistance.

In any event, the communication component 160 may include a receiver and/or a transmitter and be capable of communicating, transmitting, or receiving data, commands, etc., such as one or more autonomous or automated operating actions, a request for help, a distress signal (e.g., an SOS signal), a request for an emergency vehicle, a request for medical emergency assistance, a request for wireless towing or a leader vehicle, status information, such as vital signs of the driver, health information, vehicle status, vehicle location, vehicle mode, etc., over a network, wireless network, using short range communication techniques, using long range communication techniques, over a cellular network, across a telematics channel, etc. Examples of such communications or transmissions may include a connection, a wireless connection, vehicle to pedestrian (V2P) communications, vehicle to vehicle (V2V) communications, vehicle to motorcycle (V2M) communications, vehicle to cloud communications, dedicated short range communications (DSRC), etc.

As an example, a vehicle equipped with a system 100 for vehicle operation assistance may transmit a request for help or a help request using a combination of a dedicated short range communications (DSRC) and a cellular network, where the DSRC may be used for V2V help requests and the cellular network may be used to broadcast a request to a help center 192. In this way, the vehicle equipped with the system 100 for vehicle operation assistance may receive help quickly from responders (e.g., emergency response vehicles, such as an ambulance or a police car, or leader vehicles) found through either the DSRC or the network. Thus, it can be seen that the communication component 160 may request help by communicating (e.g., directly via V2V) with potential emergency response vehicles in the general vicinity of the vehicle equipped with system 100 for vehicle operation assistance or by communicating (e.g., indirectly via a network, wireless network, cellular network, telematics channel, etc.) with a help center 192, which may facilitate further emergency response.

The help center 192 may track the vehicle equipped with the system 100 for vehicle operation assistance and associated vehicles, such as leader vehicles which are 'wirelessly towing' the vehicle (e.g., where respective vehicles are in leader mode and follower mode). In this way, a third party may ensure the safety of or provide some level of oversight over an associated leader vehicle which is commanding or 'towing' the vehicle equipped with the system 100 for vehicle operation assistance (e.g., a follower vehicle). For example, the communication component 160 may transmit a location of the vehicle, follower vehicle, or leader vehicle, one or more autonomous or automated operating actions provided by the leader vehicle, an anticipated route, an anticipated destination, one or more vehicle parameters (e.g., speed, velocity, engine temperature, etc.). In this way, the communication component 160 may be used to provide safety, assurance, and oversight to occupants of a vehicle or follower vehicle.

In one or more embodiments, the help center 192 may provide or transmit data or changes to a route, destination, operating actions, etc. to the leader vehicle or the follower vehicle based on route information, such as a flooded road segment, traffic patterns, accidents, etc. For example, the help center 192 may provide a change in destination if an original destination hospital is booked full or has less capacity than a neighboring hospital. Here, the help center 192 may initiate the route change directly with the leader vehicle when possible (e.g., if the leader vehicle has a component with a line of communication open with the help center 192). If the leader vehicle does not have such a line of communication open, the help center 192 may pass the change of destination on to the communication component 160 of the follower vehicle, which may then use V2V communications to direct the leader vehicle to change route. From this point, the help center 192 may continue monitoring of the location of the follower vehicle to ensure compliance with the change of destination.

In the event that the leader vehicle becomes non-compliant with help center 192 protocol or instructions, the help center 192 may terminate follower mode on the follower vehicle and engage the vehicle in emergency mode (e.g., associated with an automated stop or automated pull over).

The interface component 170 may include a display portion and an input portion. The interface component 170 may receive one or more user inputs from one or more users, which may include passengers, drivers, occupants, operators, etc. of a vehicle via the input portion. The input portion of the interface component 170 may enable a user, such as a driver or occupant, to interact with or provide input, such as user input, gestures, clicks, points, selections, voice commands, etc. to a system 100 for vehicle operation assistance.

As an example, the input portion of the interface component 170 may be implemented as a touch screen, a touchpad, a track pad, one or more hardware buttons (e.g., on a radio or a steering wheel), one or more buttons, such as one or more soft buttons, one or more software buttons, one or more interactive buttons, one or more switches, a keypad, a microphone, one or more sensors, etc. In one or more embodiments, the interface component 170 may be implemented in a manner which integrates a display portion such that the interface component 170 both provides an output (e.g., renders content as the display portion) and receives inputs (e.g., user inputs). An example of this may be a touch screen. Other examples of input portions may include a microphone for capturing voice input from a user.

Regardless, the interface component 170 may receive a variety of user inputs, such as verbal commands, spoken commands (e.g., utilizing a microphone or audio sensor), pressing of buttons, activating switches, gesture inputs, such as a swipe, a multi-finger swipes, a pinch and zoom, a touch (e.g., utilizing a touch screen), a press (e.g., via pressure sensors), a press and hold, a selection, a movement of a cursor, a click (e.g., utilizing a button, mouse button, a hardware button, a soft button, a software button, track button), etc. In this way, the interface component 170 may receive one or more user inputs, such as from a user, driver, passenger, or other occupant of a vehicle.

In one or more embodiments, the display portion of the interface component 170 may render one or more buttons, such as an emergency button, a request help button (e.g., manual help button or SOS button), a confirm wireless tow button, etc. for the interface component 170 based on an emergency being determined or a request for wireless towing by one or more other components of the system 100 for vehicle operation assistance. In other words, different buttons may appear on, be generated for, or be rendered for the display portion of the interface component 170 depending on a mode of the system. Examples of modes include normal mode, emergency mode, leader mode, follower mode, meeting mode, etc.

In normal mode, the display portion of the interface component 170 may render an emergency button which, when pressed, places the system 100 for vehicle operation assistance in emergency mode, and causes the communication component 160 to initiate a request for help. Additionally, the display portion of the interface component 170 may render images or media of obstructions or objects in the roadway or road segment identified by the sensor component 130 or upcoming objects previously identified by other vehicles.

In emergency mode, the display portion of the interface component 170 may render a variety of information, such as one or more emergency response actions to be taken, estimated time of arrival to a destination, estimated time of arrival of an emergency response vehicle coming to assist the vehicle, a cancel emergency mode button, destination or route information when the vehicle is being wirelessly towed by another vehicle, such as a leader vehicle, a terminate wireless tow button.

When a vehicle is in leader mode, the display portion of the interface component 170 may render an estimated time of arrival to a destination, update information provided by a help center 192 communicatively linked with a follower vehicle (e.g., suggested destination change or route change), a cancel leader mode button, status information regarding the follower vehicle or occupants of the follower vehicle, such as vital sign information, etc. Further, the interface component 170 may enable telecommunication, such as video chat or voice calls between the leader vehicle and the follower vehicle while in emergency mode (e.g., requesting a wireless tow or leader vehicle) or leader mode.

When a vehicle is in follower mode, the display portion of the interface component 170 may render an estimated time of arrival to a destination, update information provided by a help center 192 communicatively linked with a follower vehicle (e.g., suggested destination change or route change), a cancel follower mode button, status information regarding the leader vehicle. Further, the interface component 170 may enable telecommunication, such as video chat or voice calls between the follower vehicle and the leader vehicle while requesting a wireless tow or during a wireless tow (e.g., while in follower mode).

In meeting mode, the display portion of the interface component 170 may render an estimated time of arrival to a destination location associated with a leader vehicle, a current location of the leader vehicle, an anticipated and/or route of the leader vehicle to a meeting point, a cancel meeting mode button, destination or route information where the leader vehicle will be directed to wirelessly tow the follower vehicle, etc.

Further, when a button is pushed or a command is selected, the interface component 170 may provide confirmation of the selection or the command. As another example, when a leader vehicle disconnects or terminates leader mode with a follower vehicle in follower mode based on completion of a wireless tow, or arrival at a predetermined destination location, the interface component 170 may receive confirmation that leader/follower mode has been terminated for respective leader/follower vehicles and that the destination has been reached (e.g., thank you or disconnect message or signal).

The assist component 180 may determine one or more emergency response actions when an emergency or emergency scenario is determined by one or more components of the system 100 for vehicle operation assistance. Additionally, the assist component 180 may engage other components of a vehicle in response to an emergency scenario, such as by automatically activating the hazards or hazard lights while autonomously pulling over, when stopped thereafter, etc. The assist component 180 may determine one or more emergency response actions based on availability of emergency response vehicles, health conditions of a driver of a vehicle, a status of a vehicle, traffic conditions, weather, etc. For example, if traffic is congested and a driver's condition is not sensed to be life threatening or imminently dire (e.g., based on threshold measurements from the monitoring component 110), the assist component 180 may automatically pull the vehicle over or have the vehicle stop at a 'safe' area or location via one or more automated driving actions and automatically engage the hazard lights of the vehicle.

During automatic navigation, 'wireless towing' from a leader vehicle, 'wireless following', automatic navigation to meet a leader vehicle, one or more automated driving actions, etc., the assist component 180 may perform object, obstacle, or hazard detection, mitigation, or avoidance. For example, when a sensor unit 132 of a leader vehicle detects an object or obstacle, this information may be transmitted (e.g., directly or indirectly) to the follower vehicle. Accordingly, the assist component 180 of the follower vehicle may provide one or more operating actions in response to the detected object. In this way, the assist component 180 may facilitate object avoidance or provide navigation based on one or more objects detected by the sensor component 130 of the vehicle or a sensor unit 132 or component of another vehicle. A sensor component 130 or unit 132 may include a global positioning system (GPS), exterior sensors, a radar unit, an exterior image capture device, one or more scanners, etc.

In one or more embodiments, a vehicle equipped with a system 100 for vehicle operation assistance may perform an emergency stop or a pull over in response to or based on a determination of an emergency by one or more components of the system.

As an example, if the monitoring component 110 determines that an occupant of the vehicle, such as the driver, is experiencing a stroke, heart attack, sleepiness, drowsiness, inattentiveness, etc. based on droopy eyelids (e.g., captured by an image capture component or unit), heart rate (e.g., measured by a heart rate monitor or a pulse sensor), inattentiveness (e.g., determined by an absence or lack of steering input or user initiated operating actions to the operation component 120 over a predetermined period of time or in response to an obstacle detected by the sensor component 130), the monitoring component 110 may determine that the driver is experiencing an emergency and have the assist component 180 place the system 100 for vehicle operation assistance in emergency mode.

In one or more embodiments, the operation component 120 may initiate automatic engagement of hazard lights for the vehicle or other lights, such as daytime running lights, headlights, etc. based on the vehicle being in emergency mode.

The assist component 180 may coordinate with one or more other components, such as the navigation component 140 or the communication component 160, to gather information which may be utilized to determine one or more emergency response actions. For example, the navigation component 140 may receive traffic information associated with a route to a destination, such as a hospital, or traffic information related to an area or vicinity around the vehicle (e.g., a boundary or radius around the vehicle).

As another example, the monitoring component 110 may provide vital sign readings of the driver, which may be indicative of whether the driver is experiencing a life threatening emergency or other emergency. In one or more embodiments, if the driver is not experiencing a life threatening emergency (e.g., determined based on readings from the monitoring component 110), the assist component 180 may generate an emergency response action ordering the vehicle to perform an emergency stop or pull over maneuver. Similarly, if the navigation component 140 or communication component 160 receives traffic information indicating that traffic is congested or may be difficult to autonomously navigate through (e.g., based on the speed of the traffic, number of cars or vehicles, number of lanes, lights or stop signs along a route, weather conditions, time of day, visibility index, etc.), the assist component 180 may generate an emergency response action of performing an emergency stop or pull over maneuver.

Upon generation of such an emergency response action, the navigation component 140 may select a location at which the vehicle may stop. This area or location may be an emergency stop area, such as a location which is associated with low traffic, slower traffic, etc. As an example, the navigation component 140 may determine the emergency stop area to be a shoulder of a roadway, a rest stop along a highway, a gas station, a parking lot, a parking spot, etc. The navigation component 140 may determine or select an emergency stop area based on one or more predetermined or predefined emergency stop areas and corresponding distances to the current location of the vehicle, traffic level associated therewith, population associated with the emergency stop area, time of day, etc. For example, the navigation component 140 may select an emergency stop area associated with a greater population density than other emergency stop areas, thus increasing the likelihood that help will arrive more quickly or that the driver may receive assistance or be noticed faster.

The sensor component 130 may facilitate selection of an emergency stop area, such as when a vehicle pulls over to the side of the road. Here, for example, the sensor component 130 may select an emergency stop area based on visibility to other vehicles, absence of drop-offs or cliffs along the roadway, presence of a large (e.g., greater than a threshold amount of) shoulder area, absence of large inclines or elevation changes, etc. The navigation component 140 may access map data or map information via a telematics channel, cellular network, etc. to facilitate determination or selection of the emergency stop area in a similar manner (e.g., the navigation component 140 may avoid stopping within a threshold distance of an intersection, curved road segments, etc.). In this way, the navigation component 140 may select or determine one or more emergency stop areas, thereby providing a 'safe' spot for the vehicle to park or slow down.

The storage component 150 may record or store one or more readings from the monitoring component 110, one or more operating actions or driving maneuvers associated with the operation component 120, images or media of one or more objects detected by the sensor component 130, a location history or route history associated with the vehicle, such as prior to an emergency, during an emergency, while the vehicle is in follower mode, etc. Further, the storage component 150 may record or store communications, messages, commands, or signals transmitted, received, or communicated between the vehicle and other vehicles (e.g., a second vehicle or a leader vehicle). The storage component 150 may also record one or more emergency response actions determined by the assist component 180.

The communication component 160 may communicate an emergency stop location of a vehicle to a help center 192 before or after the vehicle stops at the emergency stop location.

The interface component 170 may render a message or notification indicating that the vehicle is performing an emergency stop maneuver or engaging in one or more autonomous driving actions. A confirm button and/or a cancel button may be rendered, which enable a user or occupant to confirm or cancel the emergency stop maneuver accordingly. Further, the interface component 170 may render or display an anticipated emergency stop area, a reason for the emergency stop, an indication of whether help (e.g., an emergency response vehicle) has been automatically requested, an estimated time of arrival for the emergency response vehicle, a request a leader vehicle button, a request an emergency vehicle button, etc.

The assist component 180 may perform one or more automated operation or driving actions or maneuvers to the emergency stop area in response to the vehicle entering emergency mode and the assist component 180 determining the emergency stop maneuver as the emergency response action (e.g., and no cancel received from the interface component 170). The assist component 180 may receive one or more detected objects from the sensor component 130 or map data from the navigation component 140 to autonomously navigate to the emergency stop area based on determination of an emergency, such as by the monitoring component 110. For example, to execute the emergency stop or slow down maneuver, the assist component 180 may cause the vehicle to change lane, while avoiding objects, obstacles, or other traffic, and come to a rest at the emergency stop area.

In other embodiments, the assist component 180 may select a slow down maneuver as an emergency response action, such as when the navigation component 140 may be provided with a suggested destination via the communication component 160. For example, the communication component 160 may transmit information from the monitoring component 110, such as health information related to the occupant or driver of the vehicle, to a help center 192, which may transmit back a suggested destination, such as a hospital or other medical facility. As a result, the navigation component 140 may automatically engage in turn by turn navigation to the suggested destination using the assist component 180 and the sensor component 130 to provide one or more automated operation or driving actions or maneuvers, while mitigating collisions with objects detected by the sensor component 130.

Here, the interface component 170 may display or render a notification indicating that the vehicle is performing an emergency slow down maneuver or engaging in autonomous driving actions associated with a suggested destination. Similarly to the emergency stop maneuver, a confirm button and/or a cancel button may be rendered, which enable a user or occupant to confirm or cancel the emergency slow down maneuver accordingly. Further, the interface component 170 may render or display the suggested destination, a reason for the emergency determination, an indication of whether help (e.g., an emergency response vehicle) has been automatically requested, an estimated time of arrival at the suggested destination, etc.

In communication with a help center 192 or another vehicle (e.g., equipped with a similar system or another system 190 for vehicle operation assistance), the communication component 160 may transmit or receive information sensed, detected, or read by one or more components of the system 100 for vehicle operation assistance. For example, the communication component 160 may transmit heart rate information obtained from the monitoring component 110, steering input information (e.g., indicative of driver input) received from the operation component 120, images or media of objects captured by the sensor component 130 or image capture unit of the sensor component 130, location information (e.g., lane level information) associated with respective objects, location history from the navigation component 140, communication logs between the vehicle and one or more other vehicles, one or more emergency response actions determined by the assist component 180, etc. In this way, the communication component 160 may enable the help center 192 to keep 'tabs' on the vehicle, track the status of the vehicle (e.g., location, destination, vehicle parameters, such as velocity, engine temperature, etc.), track the status of occupants of the vehicle, provide further assistance, or provide oversight when other vehicles are engaged with the vehicle, such as when a leader vehicle is 'wirelessly towing' the vehicle (e.g., as a follower vehicle).

Thus, the communication component 160 may enable a third party, such as the help center 192 to make changes or adjustments, thereby providing efficient assistance to the driver. For example, in the event the driver is experiencing a heart attack emergency, the assist component 180 may initially determine a route to a first hospital (e.g., such as if a connection or communication channel is not available), but the help center 192 may reroute the vehicle to a second hospital based on the second hospital specializing in heart attack treatment. Thus, the communication component 160 may receive communications or adjustments based on a type of emergency the driver or occupant is experiencing and treatment options available at respective medical facilities. Further, the communication component 160 may inform the help center 192 or respective medical facilities of the vehicle's pending arrival.

Similarly, the communication component 160 may enable destination or route changes based on driving conditions, traffic conditions, or other data read by one or more of the components of the system.

In one or more embodiments, the communication component 160 may search for a leader vehicle to 'wirelessly tow' the vehicle as a follower vehicle by broadcasting a request for a leader vehicle or a request for wireless towing directly to other vehicles, such as via vehicle to vehicle (V2V) communications. This request may be communicated to one or more other vehicles (e.g., potential leader vehicles) in the area equipped with systems capable of leading or 'towing' a follower vehicle by engaging in leader mode.

In other embodiments, the communication component 160 may search for a leader vehicle broadcasting a request for a leader vehicle or a request for wireless towing over a network, such as a cellular network. In yet other embodiments, the communication component 160 may submit the request to a help center 192, which performs the searching for the vehicle by blasting out or sending a plurality of requests to other vehicles or potential leader vehicles. However, any combination of searching may be utilized. In this way, the communication component 160 may locate one or more potential leader vehicles and select a leader vehicle from among one or more of the potential leader vehicles.

The communication component 160 may broadcast a distress beacon, such as an SOS signal to facilitate assistance to the vehicle, such as when the vehicle is stuck or disabled, for example.

In one or more embodiments, the communication component 160 may be configured to communicate merely with selected vehicles, such as vehicles which are registered as part of a trusted network or a private network, for example. In this way, any communications transmitted or received by the communication component 160 may be secure. For example, upon determination of an emergency, the communication component 160 may broadcast a request for a leader vehicle to the private network of one or more potential leader vehicles, which may respond (e.g., via an interface unit 172 of the potential leader vehicle). This response may be received by the communication component 160 of the vehicle and rendered as a notification on the interface component 170.

For example, a third party, such as a security company may operate the help center 192, manage registration of potential emergency response vehicles as part of the private or trusted network. The network may be a commercial network, where a third party may manage subscriptions to the network, and employ a fleet of drivers for potential emergency response or potential leader vehicles, etc. For example, the fleet of vehicles may drive around seeking vehicles in distress or vehicles in need of a leader vehicle. In one or more embodiments, the fleet of vehicles may be a fleet of taxi cab vehicles, which are often already out searching for fares. In this regard, a fee arrangement may be implemented between the third party, help center 192, driver of the leader vehicle, vehicle or system manufacturer(s), etc. For example, the fee arrangement may be associated with a scale of prices based on factors such as a type of scenarios, a type of emergency, distance towed, etc.

In one or more embodiments, the fleet of subscribed or registered vehicles may include emergency response vehicles, such as firefighters, police, or ambulances.

In one or more embodiments, such as when a request a leader vehicle button is pressed, when the assist component 180 automatically requests a leader vehicle, or when the help center 192 initiates a request for a leader vehicle through the communication component 160, the communication component 160 may transmit a request for a leader vehicle, such as to the help center 192 or directly (e.g., V2V) to one or more other vehicles (e.g., potential leader vehicles). Explained another way, the communication component 160 may transmit a request for a responsible vehicle to assist the occupant of the vehicle by wirelessly towing the vehicle to a location determined based on a type of emergency and a location of the vehicle. Potential leader vehicles which respond may act as leader vehicles, upon confirmation or successful authentication.

In one or more embodiments, the communication component 160 may filter or select a leader vehicle from one or more of the potential leader vehicles based on a leader score associated with a driver of a corresponding potential leader vehicle or the potential leader vehicle. For example, the leader score may be based on the potential leader's previous interactions with other vehicles or other follower vehicles, ratings provided by the help center 192, etc. In this way, the communication component 160 may select a leader vehicle based on one or more leader scores of one or more potential leader vehicles.

Similarly, when a request an emergency vehicle button is pressed, when the assist component 180 automatically requests an emergency vehicle, or when the help center 192 initiates a request an emergency vehicle through the communication component 160, the communication component 160 may transmit a request for an emergency vehicle, such as to the help center 192 or directly (e.g., V2V) to one or more other vehicles (e.g., potential emergency response vehicles) to come meet the vehicle at a current location of the vehicle. This may be done when a level of emergency is high, such as when the emergency is imminent or life threatening or when an occupant is in serious or critical condition, for example.

In other embodiments, the assist component 180 may automatically request an emergency vehicle based on a location of the vehicle. In other words, if the vehicle is in a rural setting, where few vehicles generally travel, the emergency vehicle may be requested because the emergency vehicle would likely provide quicker medical attention than a scenario where the vehicle waits for a leader vehicle.

A vehicle (e.g., potential leader vehicle) responding to a request for a leader vehicle may be equipped with a system including an interface unit 172, which enables the driver of the potential leader vehicle to notify (e.g., via a communication unit 162) the help center 192 or the vehicle requesting assistance (e.g., the follower vehicle) that a leader vehicle is on the way.

Upon selection of a leader vehicle and arrival of the leader vehicle to a location associated with the vehicle, the communication component 160 may receive a command placing the vehicle in follower mode. For example, this may be automatically performed by the assist component 180 in one or more embodiments, such as when a level of an emergency exceeds a predetermined threshold or based on an urgency of the scenario or emergency (e.g., data obtained by the monitoring component 110, sensor component 130, or operation component 120 may be indicative or utilized to calculate or determine such as level of emergency or urgency of a scenario). This command may be transmitted by the help center 192 to the follower vehicle or by the leader vehicle via V2V communications.

In one or more embodiments, the follower vehicle may verify an identity of a driver of the leader vehicle or the leader vehicle itself (e.g., via the help center 192 or based on other authentication protocol). For example, the help center 192 may transmit a command to place the vehicle in follower mode when the leader vehicle arrives or is within a threshold distance of the vehicle. Similarly, the help center 192 may transmit a command to the leader vehicle placing the leader vehicle in leader mode based on the leader vehicle being within a threshold distance of the vehicle.

In other embodiments, the leader vehicle may transmit a request to a vehicle requesting the vehicle to be placed in follower mode. Using the interface component 170, the vehicle (e.g., to be placed in follower mode) may accept or decline this request, and the communication component 160 may respond to the leader vehicle or potential leader vehicle accordingly. Here, the vehicle (e.g., to be the follower vehicle) may receive the request (e.g., a "follow me" request) from the potential leader vehicle, and upon accepting the request, the potential leader vehicle becomes the leader vehicle and is placed in leader mode, while the vehicle becomes the follower vehicle and is placed in follower mode.

The interface component 170 of the vehicle may be utilized to confirm or accept a "follow me" request in some scenarios, while the help center 192, the communication component 160, or the assist component 180 may automatically confirm or accept the "follow me" requests in other scenarios, such as when authentication is performed by the help center 192 (e.g., by screening vehicles prior to the vehicle or driver becoming part of a private network). In one or more embodiments, fee agreement information may be presented and accepted prior to engaging in the wireless tow or leader/follower mode, such as when a driver is lost and desires a tow to a desired destination location. Here, the interface component 170 may render a fee arrangement such that a driver of a vehicle may accept the fee arrangement prior to engaging in the wireless towing. The interface component 170 may enable a driver or occupant of a vehicle to select from one or more potential leader vehicles in an auction mode or based on a low bid, for example.

In any event, when the vehicle is in emergency mode (e.g., via a manual press of a request for help button through the interface component 170 or as automatically determined by the monitoring component 110), the assist component 180 determines an emergency response action of requesting a leader vehicle, a potential leader vehicle is within a threshold 'tow' initiate distance from the vehicle, a "follow me" request is received (e.g., initiated by the help center 192 or the potential leader vehicle), and confirmation of the "follow me" request is provided (e.g., via the interface component 170 or automatically, such as via the assist component 180 or the communication component 160), the vehicle may be placed in follower mode. In this way, the assist component 180 may change or switch a mode of a vehicle equipped with a system 100 for vehicle operation assistance to a follower mode.

As a result, control of the vehicle in follower mode may be passed to the leader vehicle, thus enabling the assist component 180 to cause the follower vehicle to 'follow', via wireless towing, the leader vehicle (e.g., within a range of a mile). When a first vehicle is in follower mode, a second vehicle in leader mode may command the first vehicle with one or more driving actions, operating actions, driving maneuvers, etc. such that the first vehicle follows the second vehicle, thereby passing control of the first vehicle or the follower vehicle to the second vehicle or the leader vehicle.

The interface component 170 may display or render a current route, current location, anticipated destination, etc. for occupants of the follower vehicle. Similarly, an interface unit 172 of the leader vehicle may display or render a proposed route or otherwise direct the leader vehicle to a destination location, such as a hospital, using a navigation unit 142 of the leader vehicle or the navigation component 140 of the follower vehicle. A communication unit 162 of the leader vehicle may enable the help center 192 to monitor the location of the leader vehicle and/or follower vehicle to ensure wireless towing is proceeding as planned and that the leader vehicle is acting in a responsible fashion.

The assist component 180 may receive a route, one or more navigation instructions, or path history information associated with the leader vehicle and generate one or more autonomous driving actions or operating actions accordingly. In other words, the assist component 180 enables the leader vehicle to wirelessly 'tow' the follower vehicle to another location using "virtual tow", V2V "virtual tow", vehicle to vehicle "virtual tow", or driver to driver "virtual tow" technology. Explained another way, the trailing vehicle or the follower vehicle may utilized the assist component 180 to generate one or more driving cues, driving actions, or maneuvers from the lead vehicle or leader vehicle via connected-car or vehicle to vehicle (V2V) technology. This V2V communication may enable a virtual link between the leader vehicle and the follower vehicle to be formed such that the follower vehicle may 'mirror' the path of the leader vehicle moments after the leader vehicle has travelled that same path.

In other words, the assist component 180 of the follower vehicle may receive or implement one or more driving action commands or command signals from the leader vehicle via the communication component 160, such as using dedicated short range communications (DSRC). In one or more embodiments, an assist unit 182 of the leader vehicle may utilize navigation data or map data from a navigation unit 142 and/or steering input (e.g., provided by the driver of the leader vehicle) from an operation unit 122 to generate driving action commands or operating actions to be transmitted to the follower vehicle via a communication unit 162 or transmitters of the leader vehicle.

Similarly, the communication component 160 of the follower vehicle may receive one or more of the driving action commands or operating actions. The communication component 160 may pass these commands on to the assist component 180 of the follower vehicle, which may implement or execute respective driving action commands or operation commands accordingly. However, the assist component 180 of the follower vehicle may pause, cancel, or modify one or more respective driving action commands or operation commands based on one or more objects detected by the sensor component 130, thereby mitigating collisions with respective objects. In this way, autonomous control of the follower vehicle in follower mode may be provided.

In one or more embodiments, the follower vehicle may communicate with the leader vehicle via the communication component 160 and the communication unit 162, respectively. For example, if the follower vehicle is stuck, requires additional assistance, needs the leader vehicle to wait, etc., the communication component 160 may transmit respective information to the leader vehicle. In this way, respective leader and follower vehicles may continuously communicate during a wireless tow or while in leader/follower mode. Stated another way, the follower vehicle may be 'tethered' to the leader vehicle during the wireless tow.

In one or more embodiments, a help center 192 may act as an intermediary between the two vehicles, such as to facilitate processing of driving action commands or to provide oversight on actions taken by the leader vehicle. Further, the leader vehicle may be equipped with a system 100 for vehicle operation assistance or another system 190 which enables 'wireless' towing.

The sensor component 130 and the navigation component 140 may provide input to the assist component 180 such that the follower vehicle obeys traffic laws and mitigates or avoids colliding into objects or obstacles which were not necessarily present when the leader vehicle travelled along a portion of a path or a roadway. For example, if a light that is green when the leader vehicle passes may turn red by the time the follower vehicle reaches the light. In this scenario, the interface unit 172 of the leader vehicle may notify the driver that the follower vehicle is falling behind and request the driver of the leader vehicle wait for the follower vehicle. If the leader vehicle continues on, the wireless tow or leader/follower mode may automatically be terminated by the assist component 180. The sensor component 130 of the follower vehicle may identify the red light as an obstacle and have the assist component 180 provide automated braking in response.

In on more embodiments, the wireless tow or leader/follower mode may be terminated for the leader vehicle and follower vehicle, respectively, based on one or more different scenarios, such as when a destination is reached, when one or more of the vehicles or the help center 192 cancels or terminates the tow, based on one or more inputs from one or more sensors or components of either vehicle, upon detection of malicious intent associated with one or more of the vehicles (e.g., either follower or leader vehicle), etc. For example, when the leader vehicle and the follower vehicle reach an agreed or anticipated destination location, the virtual tow or wireless tow may be complete, and thus the assist component 180 of the follower vehicle terminate or cancel the wireless tow.

As used herein, a wireless tow may include a scenario where a leader vehicle is in leader mode and a follower vehicle is in follower mode, and respective vehicles are pair together via a communication component 160 or a communication unit 162. Further, when any one of the follower vehicle, the leader vehicle, or a help center 192 cancel or terminate a wireless tow, the assist unit 182 of the leader vehicle may place the leader vehicle in a normal mode or a search for emergency mode. Similarly, the assist component 180 of the follower vehicle may place the follower vehicle in normal mode or revert to emergency mode based on whether the wireless tow is complete or the location of the follower vehicle. In other words, if the follower vehicle has reached a desired destination, the assist component 180 may terminate the tow and place the follower vehicle in normal mode.

In the event that the wireless tow is not proceeding as planned (e.g., the leader vehicle cannot continue the tow, the leader vehicle is not proceeding to the anticipated or desired destination, due to a manual cancel via the interface component 170, a lost connection between the leader vehicle and the follower vehicle, etc.), the assist component 180 may revert the follower vehicle to emergency mode and determine one or more contingency emergency response actions or one or more other emergency response actions, such as searching for a new or different leader vehicle, requesting on site help, broadcasting an SOS beacon, performing autonomous driving to a destination location (e.g., a medical facility), etc. For example, the follower vehicle may initiate an emergency stop maneuver at an emergency stop area, request a different leader vehicle, etc.

In one or more embodiments, the communication component 160 may receive information, such as information from the help center 192, pertaining to availability of one or more potential leader vehicles in the area. When availability is low or below a threshold number of vehicles, above a threshold estimated response time, etc., the assist component 180 of the vehicle may place the vehicle in autonomous operation mode, thereby directing the vehicle to engage in one or more automated driving actions. The communication component 160 may transmit help requests or an SOS signal continually, such as until the vehicle reaches a destination, cancels emergency mode, or is engaged in wireless tow (e.g., leader/follower mode).

In one or more embodiments, the assist component 180 or the help center 192 may analyze one or more actions taken by the driver of the leader vehicle or by the driver of the follower vehicle, calculate an intent status, and terminate or cancel the wireless tow based on respective actions or a malicious intent (e.g., intent status) inferred from respective actions. For example, if the leader vehicle deviates a threshold distance from an anticipated route, resets the anticipated destination without authorization, is notified, and continues leading the follower vehicle on a route away from the anticipated destination without a proper response or providing clarification, the assist component 180 of the follower vehicle or the help center 192 may infer that the driver of the leader vehicle is acting with malicious intent or is not suitable as a leader. As a result, the assist component 180 or the help center 192 may terminate the wireless tow relationship between the two vehicles.

When the help center 192 initiates termination of leader/follower mode, the communication component 160 may receive a terminate follow mode command from the help center 192 and the assist component 180 may terminate or deactivate the tow accordingly. When the assist component 180 of the follower vehicle determined malicious intent or that the leader vehicle has become unsuitable as a leader vehicle, the communication component 160 may report the leader vehicle to the help center 192, thereby impacting the leader score for the corresponding leader vehicle.

As another example, if the sensor component 130 of the follower vehicle detects greater than a threshold number of obstacles or objects, such as objects which prevent the follower vehicle from moving, tailing, or following the leader vehicle, the assist component 180 may terminate the wireless tow and revert the follower vehicle to emergency mode. If a manual cancel button provided by the interface component 170 is pressed, the assist component 180 may place the follower vehicle in normal mode. Further, once the wireless tow or leader/follower mode is terminated or cancelled, the follower vehicle and the leader vehicle may not be considered follower and leader vehicles at that point, but instead as potential follower or potential leader vehicles.

In one or more embodiments, the assist component 180 may combine one or more emergency response actions or perform respective actions in a simultaneous or concurrent matter, such as by providing one or more automated driving actions to navigate to a first destination where a leader vehicle may meet the vehicle in order to tow the vehicle as a follower vehicle to a second destination, such as a hospital or medical facility. The navigation component 140 or the help center 192 may arrange or determine a meeting point for the vehicle (e.g., to become the follower vehicle) and a potential leader vehicle (e.g., to become the leader vehicle), such as using one or more global positioning unit (GPS) algorithms, or based on a status of an occupant, health information associated with an occupant, etc. In this way, vehicle operation assistance may be provided quickly because both vehicles may be moving toward a common meeting point, thereby shortening the distance each vehicle needs to travel in order for assistance, such as medical attention, to be provided.

In one or more embodiments, one or more of the automated driving actions or operating actions implemented, executed, or provided by the assist component 180 may include an automatic lane change action or be implemented in an autonomous fashion. For example, this automatic lane change action may be provided in response to or based on a detected object or obstacle. Objects or obstacles may be detected by the sensor component 130 of the vehicle or a sensor unit 132 of another vehicle. That other vehicle may upload information related to the object to a database, which may be accessed by the vehicle or the other vehicle may transmit information related to the object directly to the vehicle via V2V communications or DSRC, for example.

This type of hazard or object mitigation or avoidance may be utilized or employed during an emergency stop maneuver, while a follower vehicle is in follower mode, while a vehicle is in leader mode, while a vehicle is performing one or more autonomous driving actions, employing lane keep functionality, etc. Further, hazard or object mitigation or avoidance may be employed by one or more vehicles which are not necessarily in a leader/follower relationship (e.g., although vehicles in a leader/follower relationship may utilize or employ such avoidance in one or more embodiments). In this way, an assist component 180 may utilize V2V communications or other communications, such as cloud communications to receive information or to detect and inform drivers of objects or obstacles in the roadway, or react accordingly, such as by providing a visual notification or a real time image of the object, including lane level detail location information, or by performing an automatic lane change.

In one or more embodiments, a first vehicle equipped with a system, such as a system 100 for vehicle operation assistance may facilitate the building of a hazard database. The hazard database may be a database of one or more hazards, objects, obstacles, etc. detected by a plurality of vehicles. Objects or hazards may be detected or determined by a vehicle (e.g., such as the first vehicle) in a variety of ways. For example, a sensor unit 132 of a first vehicle may include an image capture unit which continuously captures images of the surrounding environment, including one or more potential objects or hazards. When a predetermined or predefined operating action is detected by the operation unit 122, such as a hard brake, sudden swerve or change in steering, etc., an image of a corresponding object may be captured by the sensor unit 132. Thus, images which were previously captured (e.g., due to the continuous capture) may be utilized and hazards may be extracted or identified accordingly.

Examples of predetermined or predefined operating actions associated with defining an object as a hazard for capture or upload to the hazard database may include excessive steering inputs, excessive braking over a threshold limit, actuation of the brake pedal, a panic maneuver, or threshold changes in steering angle, etc. As a result of one or more of these predetermined or predefined operating actions, the sensor unit 132 may extract images or media of corresponding objects or objects associated with such operating actions.

Further, sensor unit 132 and/or the navigation unit 142 may identify or gather lane level information associated with the object. For example, the sensor unit 132 may recognize lane markings on the roadway in conjunction with map data from the navigation unit 142 to identify or pinpoint a lane associated with an object or a hazard. In this way, the sensor unit 132 and/or the navigation unit 142 may determine a lane level location associated with an object.

Further, the sensor unit 132 may perform one or more transforms to estimate coordinates of the object or hazard based on a camera angle associated with the sensor unit 132, a pose of the first vehicle, relative size of the object in a captured image, distance of the object from the first vehicle, etc. In any event, the sensor unit 132 may determine an object is present, poses a risk, define the object as a hazard, and store associated lane level location information and an image of the hazard.

When an object is confirmed by the sensor unit 132 (e.g., or via a prompt rendered by the interface unit 172), images or media of the object and corresponding coordinate or location information may be transmitted. In one or more embodiments, a communication unit 162 of the first vehicle may transmit one or more images of one or more hazards directly to one or more other vehicles (e.g., second vehicle, third vehicle, vehicles within a predetermined area or radius of the first vehicle, vehicles approaching the hazard, etc.).

In other embodiments, the communication unit 162 of the first vehicle may transmit such images to a hazard database. In this way, the communication unit 162 of the first vehicle may notify other vehicles of the object as a hazard. In one or more embodiments, the interface unit 172 of the first vehicle may display or render one or more images of one or more hazards prior to uploading respective images to the hazards database or transmitting respective images to other vehicles until confirmation is provided by the driver of the first vehicle. In other embodiments, no confirmation is required.

A navigation component 140 of a second vehicle may provide a hazard database with a current location of the vehicle to lookup hazards in the area. As an example, the sensor component 130 may be utilized to supplement the navigation component 140 with the lane level location of the vehicle.

The communication component 160 of the second vehicle may receive hazard information or images associated with one or more hazards within a predefined area, such as a radius or boundary around the second vehicle. This information may be received from a hazard database or directly from a first vehicle in the area via V2V communications. In one or more embodiments, the communication component 160 may receive images or media of hazards located in a direction in which the second vehicle is travelling. Further, the communication component 160 may receive lane level location information associated with respective hazards.

Upon determination that a hazard or object exists (e.g., as determined by the communication received from the hazard database or from another vehicle as a 'reported hazard') in a lane of travel of the second vehicle (or within a threshold distance to the second vehicle), one or more response actions may be generated by the assist component 180 and an image of the hazard may be rendered for the driver of the second vehicle. In other words, the assist component 180 may perform lane level matching to determine whether the vehicle is in the same lane as an upcoming reported hazard. Further, the assist component 180 may utilize this information to generate one or more response actions or driving actions, such as to switch from a current lane (e.g., associated with the same lane as a hazard) to a different lane which is not associated with an upcoming hazard.

The interface component 170 of the second vehicle may render an image of the hazard or media associated with the hazard as the second vehicle approaches the hazard. This image may be rendered such that lane level detail is shown, such as by providing a portion or zoomed portion of the image of the hazard. In this way, the interface component 170 of the second vehicle may inform or notify the driver of the second vehicle of one or more objects which pose a risk and have been identified as hazards such that the second vehicle has at least a threshold amount of time to react to the hazard, thereby acting as an early warning system or an advance notification system.

In one or more embodiments, vehicle components, such as the interface component 170 or the operation component 120 may be utilized to provide a notification to the driver of the second vehicle, such as by illuminating LEDs while rendering an image of the hazard on the display portion of the interface component 170 of the second vehicle. If the second vehicle is engaged in a lane keep mode (e.g., a mode where the vehicle is intended to maintain travel in a single or same lane), the interface component 170 or operation component 120 may provide a notification or suggestion to change lanes. For example, lights may be flashed on the dash of the vehicle, an audio notification may be played back, LEDs may be illuminated, the suggestion may be rendered on a heads up display, etc.

A driver or occupant of a vehicle may accept or decline the suggested lane change using one or more vehicle components, such as the interface component 170 or the operation component 120. In one or more embodiments, the interface component 170 may render an accept lane change button on the display portion. In other embodiments, the driver may accept the suggested lane change by activating the turn signal in the direction of the suggested lane change. In embodiments where a second vehicle is following a first vehicle in a wireless or virtual tow scenario (e.g., respective vehicles are in leader/follower mode), turn signal actuation or other confirmation may not be required, thereby enabling the tailing or trailing vehicle in follower mode to perform an automated lane change and continue smooth driving without interruptions or requiring confirmation.

Regardless, in some embodiments, the operation component 120, such as the turn signal, may be used in response to a suggested lane change or an automatic lane change suggestion. The suggested lane change notification (e.g., or associated notifications) may be presented, rendered, or played until the hazard is passed or until the driver manually changes lanes or takes other driving action or operating action, such as braking, steering, etc.

The assist component 180 may implement the lane change suggestion as a driving action accordingly, such as in response to confirmation of a lane change suggestion, thereby providing appropriate steering in anticipation of an object or a hazard reported by another vehicle. In other words, the assist component 180 may navigate a vehicle around a hazard to mitigate damage to the vehicle and/or object which is the hazard. In this way, the second vehicle may be provided with sufficient time or a larger margin to react to the reported hazard and make a smoother automatic lane change.

In one or more embodiments, the assist component 180 may adjust one or more adaptive cruise control (ACC) settings, such as by turning a sensitivity level of the ACC up or by increasing a following distance between a vehicle and another vehicle in front of the vehicle based on a communication that a hazard is a threshold distance ahead, such as a half mile, for example. Thus, when another vehicle alerts the second vehicle about a hazard, a following distance or a safety margin distance may be increased or adjusted by the assist component 180 because it may be likely that other vehicles in the vicinity of the hazard may travel slowly, brake suddenly, change direction of travel, etc.

In this way, the assist component 180 may compensate for other vehicles near a hazard when the hazard is reported (e.g., via the communication component 160 from a hazard database or from other vehicles via V2V or DSRC). In one or more embodiments, the assist component 180 may maximize the distance setting for the safety margin distance to promote safe driving, thereby permitting for more reaction time to account for the object or hazard and other vehicle's reaction to the hazard.

In one or more embodiments, a sensor component 130 of a second vehicle may be utilized to verify, cross-check, or reference the existence or the location of a hazard from the hazard database. If no hazard is found or detected based on inputs from the operation component 120 or the sensor component 130 of the second vehicle or one or more inconsistencies are found in that one or more hazards reported could not be verified by the sensor component 130, the communication component 160 of the second vehicle may transmit a signal to the hazard database indicating that the hazard is no longer present.

In one or more embodiments, multiple vehicles may be utilized to verify the existence or absence of a hazard prior to updating the hazard database. Thus, when a threshold number of vehicles pass the alleged hazard location without incident, such as a manual lane change or the sensor component 130 detecting the hazard, the hazard database may remove an entry corresponding to that hazard. In other embodiments, the hazard database may be updated or hazards automatically removed after a predetermined length of time after detection of the hazard or entry of the hazard in the hazard database.

Figure 2:
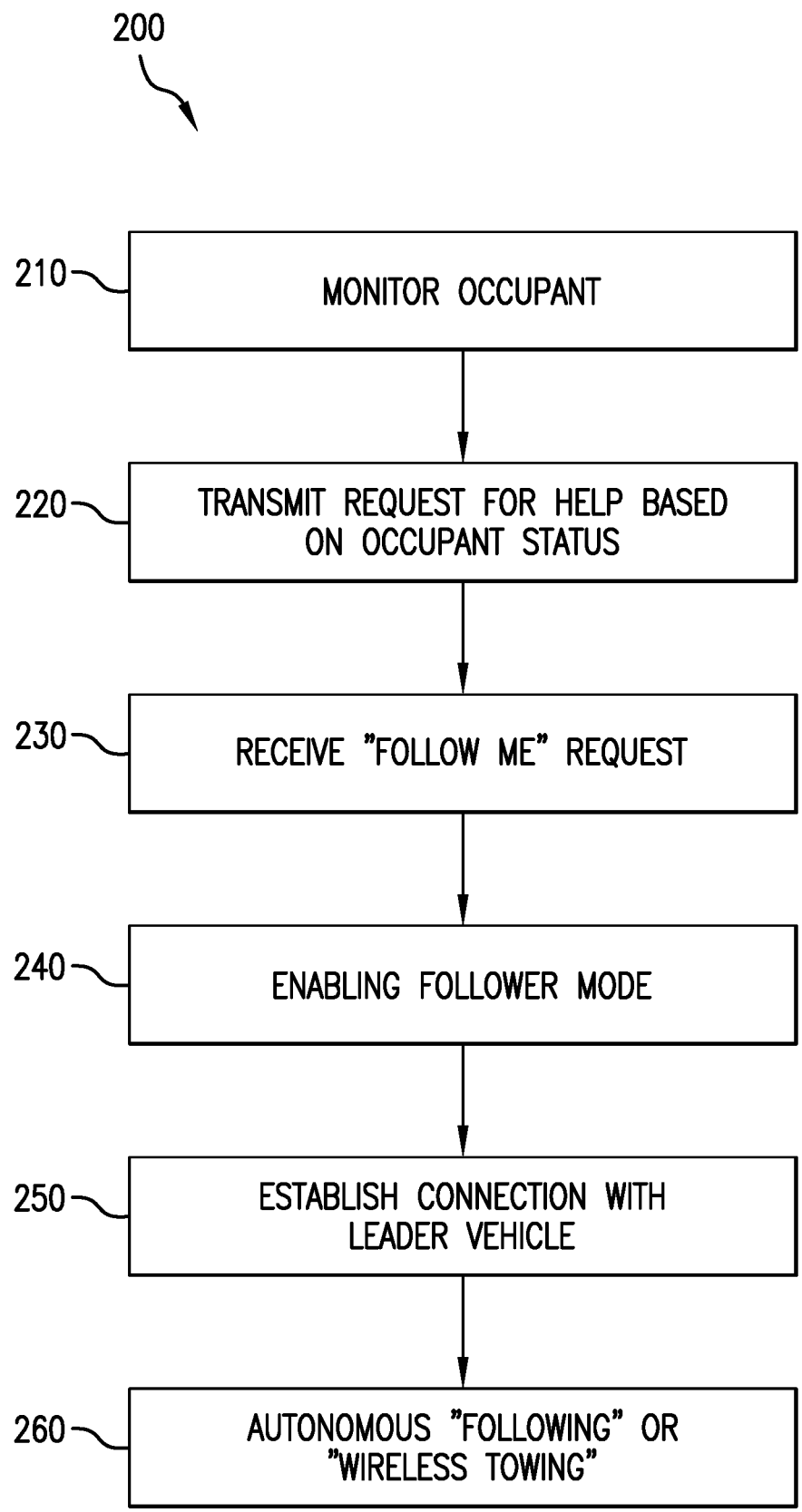
FIG. 2 is an illustration of an example flow diagram of a method for vehicle operation assistance, according to one or more embodiments.

FIG. 2 is an illustration of an example flow diagram of a method 200 for vehicle operation assistance, according to one or more embodiments. At 210, an occupant of a vehicle or automobile may be monitored. For example, vital signs of the occupant may be recorded. Based on respective vital sign information, a status of the occupant may be determined to indicate whether the occupant is experiencing an emergency. If an emergency is determined, a request for help may be transmitted 220 based on the occupant status and the vehicle automatically stopped. Emergency response vehicles, such as a potential leader vehicle may arrive at the scene. The potential leader vehicle may transmit a "follow me" request to the vehicle. According to one or more aspects, verification of the potential leader vehicle may be implemented. Regardless, when the "follow me" request is accepted (e.g., either automatically through help center assistance or via one or more vehicle components or manually via an interface of the vehicle and occupant approval), the vehicle may enter or enable follower mode 240.

In follower mode, the vehicle may establish a connection, such as a wireless connection, with the leader vehicle (e.g., previously a potential leader vehicle when the "follow me" request was still pending or not yet accepted). Using this wireless connection or connection, the vehicle may perform autonomous 'following' or be 'wirelessly towed' by the now leader vehicle. According to one or more aspects, hazard mitigation may be performed using one or more sensors one the vehicle itself or preemptively avoiding hazards detected by sensors of other vehicles (e.g., which may include, but are not necessarily the leader vehicle).

Figure 3A:
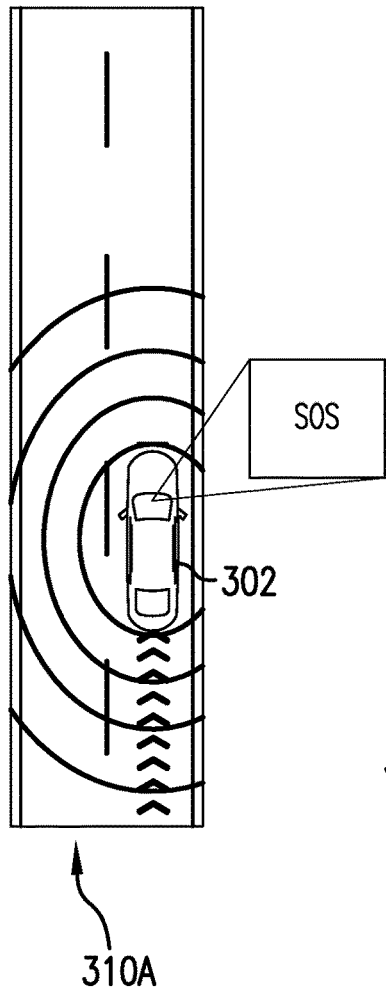
FIGS. 3A-3C are illustrations of an example scenario where a system or method for vehicle operation assistance may be employed, according to one or more embodiments.
Figure 3B:
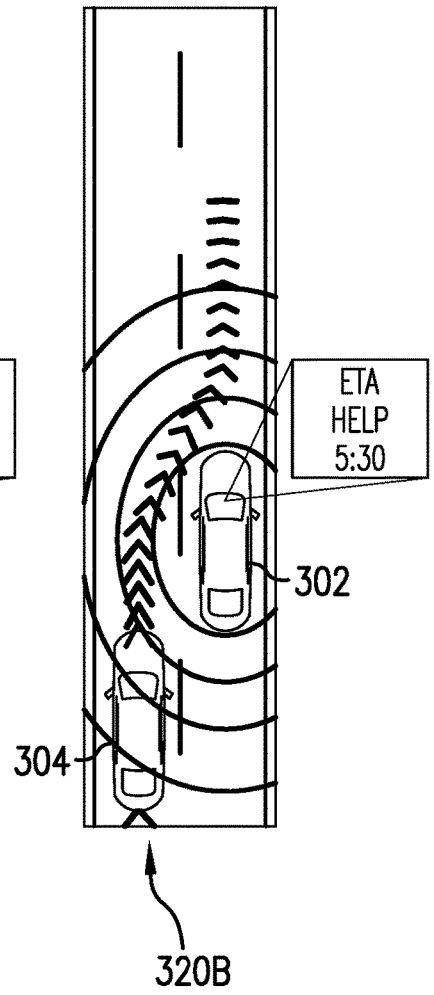
Figure 3C:
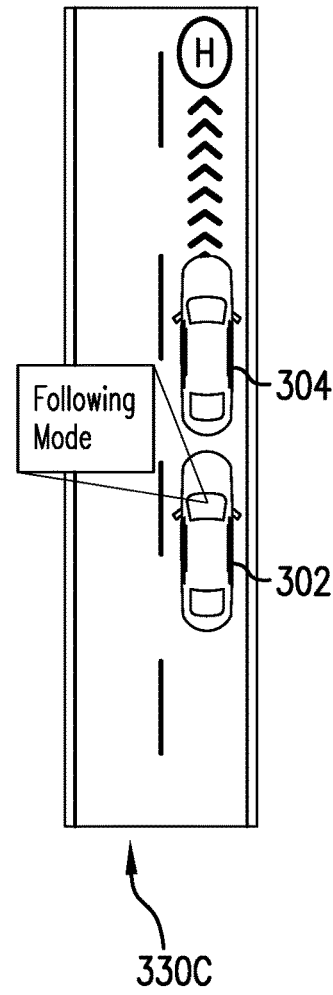

FIGS. 3A-3C are illustrations of an example scenario where a system or method for vehicle operation assistance may be employed, according to one or more embodiments. In FIG. 3A, at 310A, a vehicle 302 associated with an occupant experiencing an emergency may automatically stop or perform an automatic stop maneuver and broadcast an SOS signal. In FIG. 3B, at 320B, the vehicle 302 may render an estimated help arrival time. Vehicle 304 may arrive and connect with vehicle 302, thus providing wireless towing. In FIG. 3C, at 330C, vehicle 304 may wirelessly tow the vehicle 302. Vehicle 304 may be in leader mode and vehicle 302 may be in follower mode.

Figure 4:
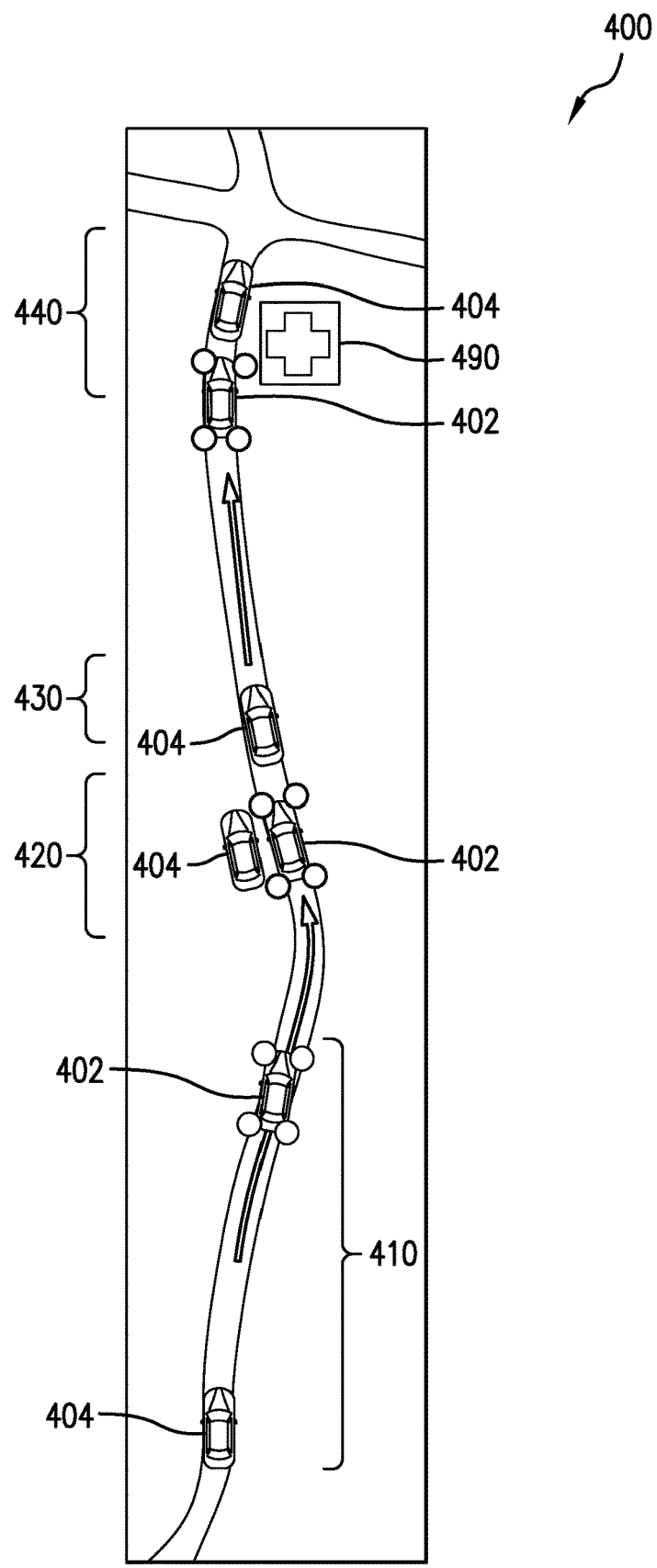
FIG. 4 is an illustration of an example scenario where a system or method for vehicle operation assistance may be employed, according to one or more embodiments.

FIG. 4 is an illustration of an example scenario 400 where a system or method for vehicle operation assistance may be employed, according to one or more embodiments. At 410, a first vehicle 404 may be equipped with a system for vehicle operation assistance and a second vehicle 402 may be equipped with a system for vehicle operation assistance. The second vehicle 402 may be travelling along a roadway or through an operation environment. If an occupant of the second vehicle 402 experiences an emergency, the second vehicle 402 may automatically pull over at 410 and transmit a request for a leader vehicle. Upon receiving such a request, the first vehicle 404 (e.g., potential leader vehicle) may travel to a location associated with the second vehicle 402, as seen at 420.

At 420, the first vehicle 404 may transmit a "follow me" request to the second vehicle 402 to wirelessly connect with the second vehicle 402. Upon establishing such a connection, the second vehicle 402 may effectively have control over the first vehicle 404. Accordingly, at 430, the first vehicle 404 may initiate wireless towing of the second vehicle. Here, the first vehicle 404 may be a leader vehicle in leader mode and the second vehicle 402 may be a follower vehicle in follower mode.

At 440, the first vehicle 404 or the second vehicle 402 may terminate the wireless tow or leader/follower mode upon arrival at an agreed destination, such as a medical facility 490.

Figure 5:
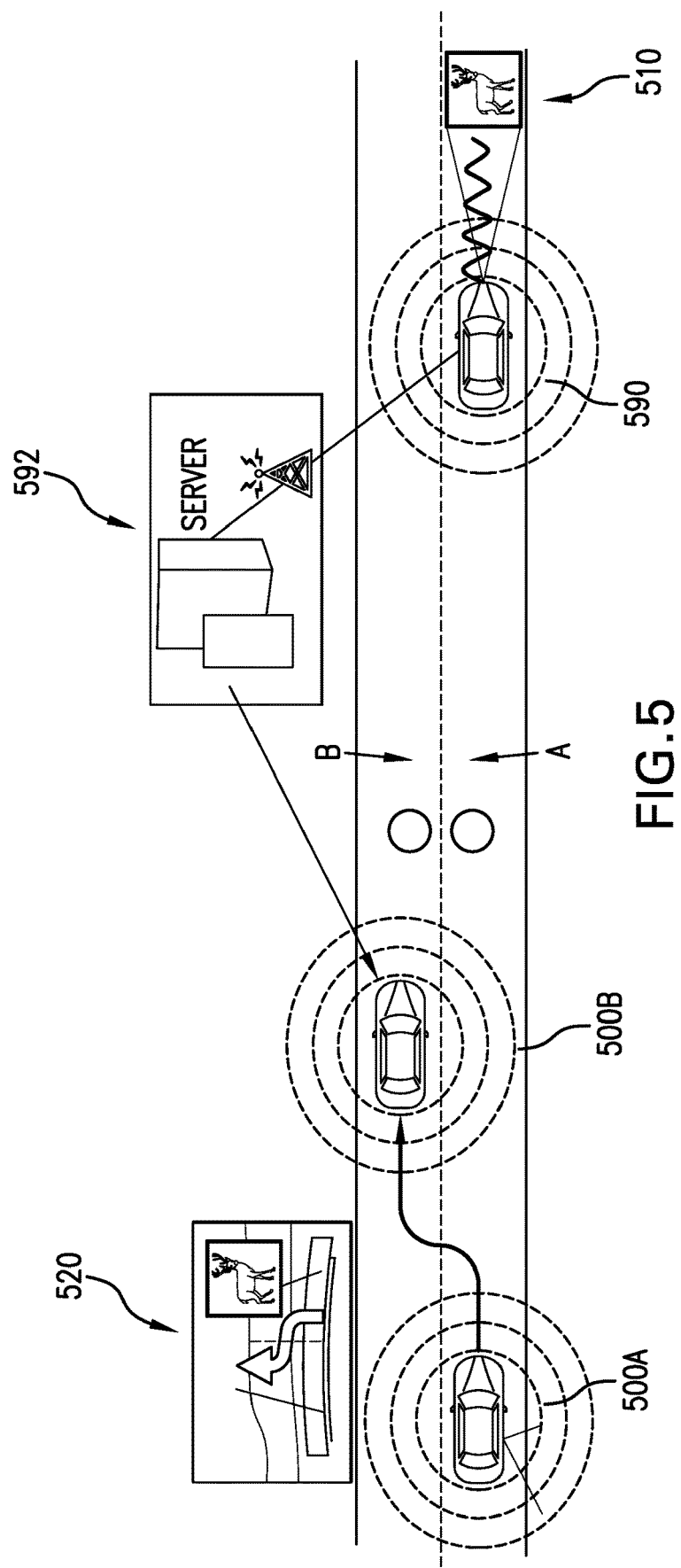
FIG. 5 is an illustration of an example scenario where a system or method for vehicle operation assistance may be employed, according to one or more embodiments.

FIG. 5 is an illustration of an example scenario 500 where a system or method for vehicle operation assistance may be employed, according to one or more embodiments. In FIG. 5, a first vehicle 590 may be travelling along a roadway. For example, the roadway may include one or more lanes of travel, such as a first lane of travel A and a second lane of travel B. Upon detection of an object or hazard 510, the first vehicle 590 may capture an image of the hazard 510 and determine a lane level location for the hazard 510. In this example, the hazard 510 is associated with lane A. The first vehicle 590 may transmit an image of the hazard 510 and lane level information associated with the hazard 510.

In one or more embodiments, the first vehicle 590 may transmit this information or image to a database or server 592, which may record or store this image and lane level location information. The server 592 or the first vehicle 590 may identify the hazard 510. In other embodiments, the first vehicle 590 may transmit the image or information directly to a second vehicle 500A.

A second vehicle 500A may receive an image of the hazard 510 as well as corresponding lane level location information for the hazard 510 (e.g., indicating that the hazard is located in lane A) based on a proximity to the reported hazard 510, a direction of travel of the second vehicle 500A, etc. Here, in this example, because the second vehicle 500A is travelling in lane A, the second vehicle 500A may perform an automatic lane change to lane B, as seen at 500B, for example. Further, the second vehicle 500A may render an image of the hazard at 520.

In one or more embodiments, the second vehicle 500A may perform the automatic lane change to be in the position shown at 500B based on the second vehicle employing a lane keep assist function at 500A. According to one or more aspects, the second vehicle 500A may request permission to change lanes, as seen at 520, indicated with an arrow, for example. Here, the driver may actuate one or more operation components of the vehicle to accept, permit, or deny such as proposed lane change. Here, for example, the driver of the second vehicle 500A may actuate the left turn switch to approve the automated lane change.

Further, the rendering of the image of the hazard and proposed lane change at 520 may be automatically dismissed if the driver of the second vehicle 500A takes manual action to brake, change lanes, etc. In this way, a first vehicle may provide a second vehicle with an early warning notice to facilitate an automatic or automated operation response or driving action, such as an automatic lane change. Further, the first vehicle may also provide the second vehicle with an image of the object so that the driver of the second vehicle may make a more informed decision in that regard.

Figure 6:
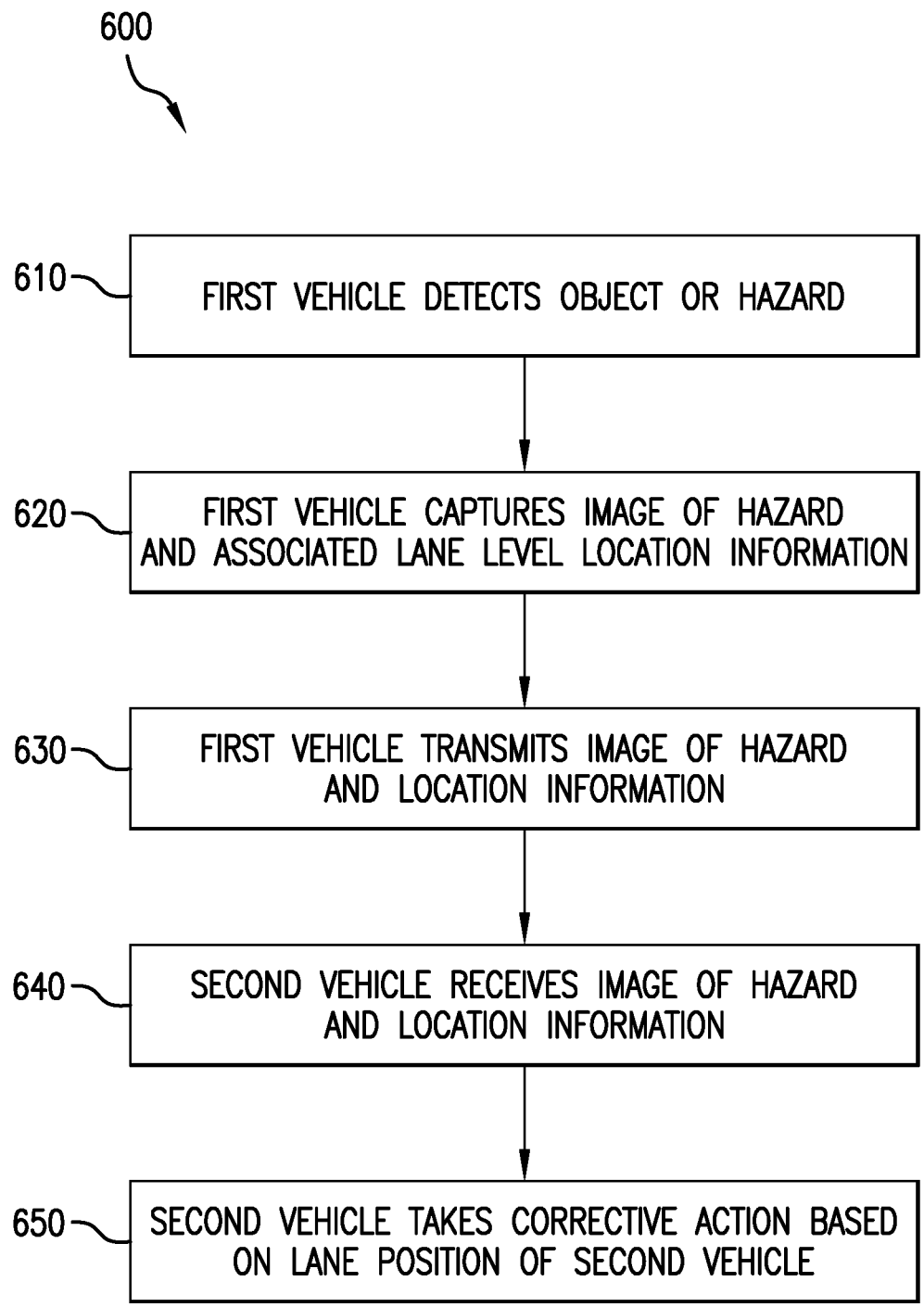
FIG. 6 is an illustration of an example flow diagram of a method for vehicle operation assistance, according to one or more embodiments.

FIG. 6 is an illustration of an example flow diagram of a method 600 for vehicle operation assistance, according to one or more embodiments. In one or more embodiments, the method 600 merely includes 610, 620, and 630. In other embodiments, the method 600 may merely include 640 and 650. For example, the method 600 may be for building a database of one or more images of one or more hazards and corresponding lane level location data or information associated therewith. According to other aspects, the method may be for using an already constructed database to perform or implement hazard mitigation. In one or more embodiments, a first vehicle may detect an object at 610. The vehicle may determine that the object is a hazard. At 620, the first vehicle may capture an image of the hazard and determine or record lane level location information associated with that hazard. For example, lane markings, GPS, or PnP algorithms may be utilized or implemented to determine the lane level location of an object or hazard. At 630, media or an image of the hazard as well as corresponding location information may be uploaded or transmitted. This information may be transmitted or uploaded to a hazard database or directly to one or more other vehicles in the area, such as within a predetermined radius or boundary of the first vehicle. In one or more embodiments, such as in embodiments where transmission is performed directly to other vehicles, the transmission may be based on a direction of travel of the other vehicles. In other words, the first vehicle may transmit respective images or information merely to vehicles travelling towards a detected hazard.

At 640, a second vehicle may receive an image of the hazard reported by the first vehicle. As discussed, this image and lane level location information may be received direction from a communication unit of the first vehicle or from a hazard database. The second vehicle may receive this information based on a general location of the second vehicle, which may be provided by a GPS unit for the second vehicle. Further, the second vehicle may receive this image or information based on a direction of travel of the second vehicle. For example, if the second vehicle is travelling in a direction towards the reported hazard, then corresponding image or location information may be received. In any event, after the image or location information of the reported hazard is received, the second vehicle may perform lane level matching to determine a current lane location or lane position for the second vehicle. If this lane level matching determined that the second vehicle is in the same lane as the reported obstacle, corrective action may be taken 650 based on the lane position of the second vehicle, one or more available lanes, a current traffic situation, other detected obstacles, a contour of the roadway, etc.

Figure 7:
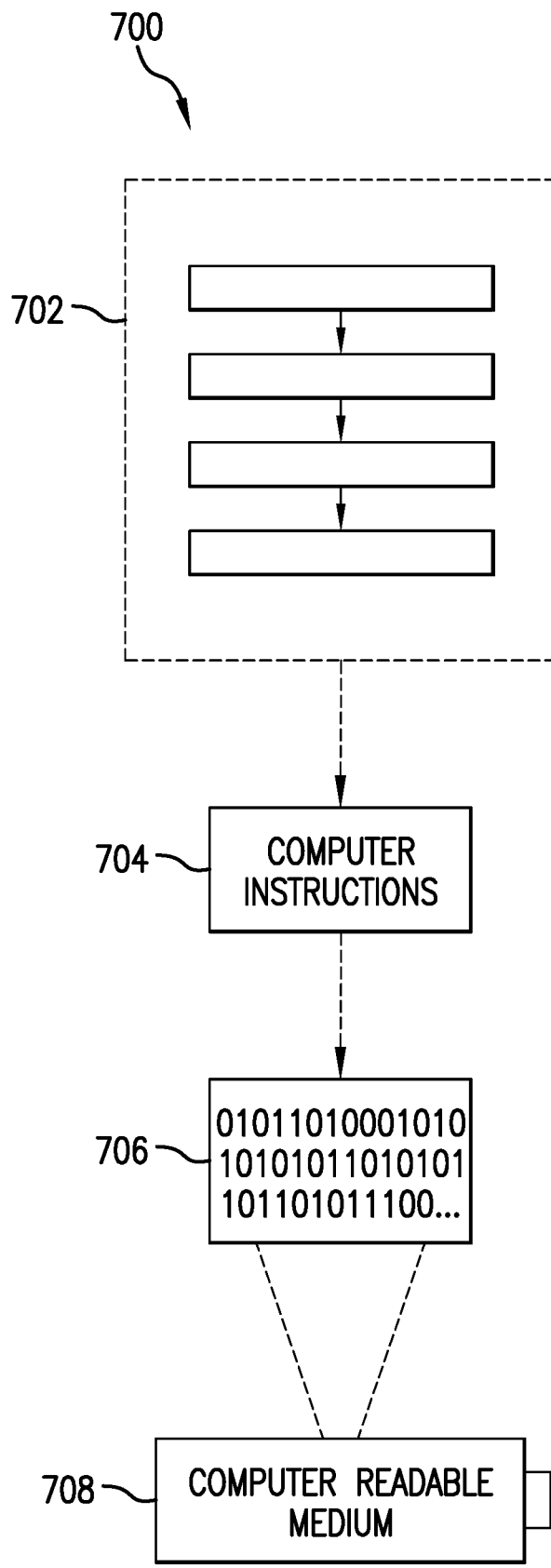
FIG. 7 is an illustration of an example computer-readable medium or computer-readable device including processor-executable instructions configured to embody one or more of the provisions set forth herein, according to one or more embodiments.

Still another embodiment involves a computer-readable medium including processor-executable instructions configured to implement one or more embodiments of the techniques presented herein. An embodiment of a computer-readable medium or a computer-readable device devised in these ways is illustrated in FIG. 7, wherein an implementation 700 includes a computer-readable medium 708, such as a CD-R, DVD-R, flash drive, a platter of a hard disk drive, etc., on which is encoded computer-readable data 706. This encoded computer-readable data 706, such as binary data including a plurality of zero's and one's as shown in 706, in turn includes a set of processor-executable computer instructions 704 configured to operate according to one or more of the principles set forth herein. In one such embodiment 700, the processor-executable computer instructions 704 may be configured to perform a method 702, such as the method 200 of FIG. 2. In another embodiment, the processor-executable computer instructions 704 may be configured to implement a system, such as the system 100 of FIG. 1. Many such computer-readable media may be devised by those of ordinary skill in the art that are configured to operate in accordance with the techniques presented herein.

As used in this application, the terms "component", "module," "system", "interface", and the like are generally intended to refer to a computer-related entity, either hardware, a combination of hardware and software, software, or software in execution. For example, a component may be, but is not limited to being, a process running on a processor, a processor, an object, an executable, a thread of execution, a program, or a computer. By way of illustration, both an application running on a controller and the controller may be a component. One or more components residing within a process or thread of execution and a component may be localized on one computer or distributed between two or more computers.

Further, the claimed subject matter is implemented as a method, apparatus, or article of manufacture using standard programming or engineering techniques to produce software, firmware, hardware, or any combination thereof to control a computer to implement the disclosed subject matter. The term "article of manufacture" as used herein is intended to encompass a computer program accessible from any computer-readable device, carrier, or media. Of course, many modifications may be made to this configuration without departing from the scope or spirit of the claimed subject matter.

Figure 8:
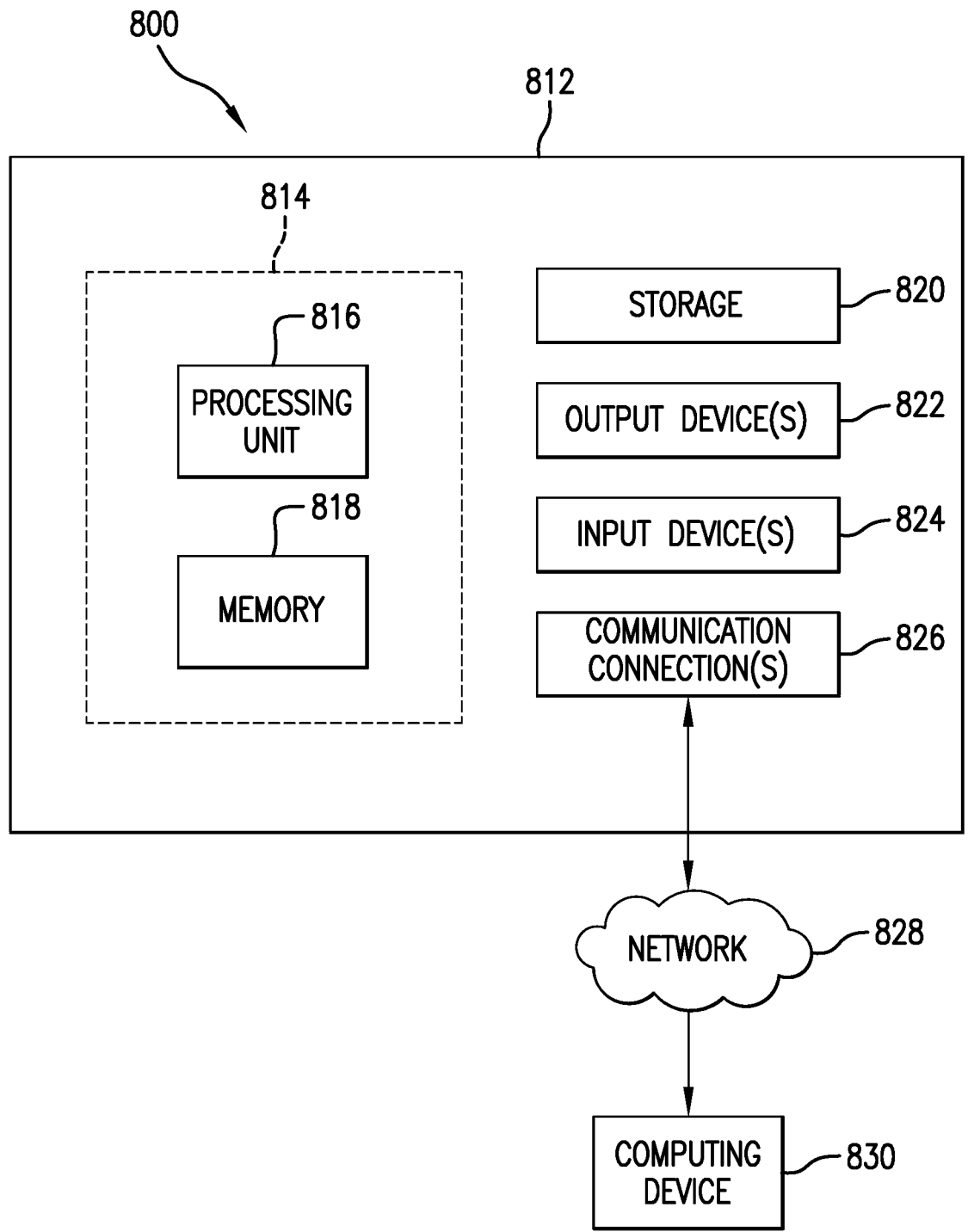
FIG. 8 is an illustration of an example computing environment where one or more of the provisions set forth herein are implemented, according to one or more embodiments.

FIG. 8 and the following discussion provide a description of a suitable computing environment to implement embodiments of one or more of the provisions set forth herein. The operating environment of FIG. 8 is merely one example of a suitable operating environment and is not intended to suggest any limitation as to the scope of use or functionality of the operating environment. Example computing devices include, but are not limited to, personal computers, server computers, hand-held or laptop devices, mobile devices, such as mobile phones, Personal Digital Assistants (PDAs), media players, and the like, multiprocessor systems, consumer electronics, mini computers, mainframe computers, distributed computing environments that include any of the above systems or devices, etc.

Generally, embodiments are described in the general context of "computer readable instructions" being executed by one or more computing devices. Computer readable instructions may be distributed via computer readable media as will be discussed below. Computer readable instructions may be implemented as program modules, such as functions, objects, Application Programming Interfaces (APIs), data structures, and the like, that perform one or more tasks or implement one or more abstract data types. Typically, the functionality of the computer readable instructions are combined or distributed as desired in various environments.

FIG. 8 illustrates a system 800 including a computing device 812 configured to implement one or more embodiments provided herein. In one configuration, computing device 812 includes at least one processing unit 816 and memory 818. Depending on the exact configuration and type of computing device, memory 818 may be volatile, such as RAM, non-volatile, such as ROM, flash memory, etc., or a combination of the two. This configuration is illustrated in FIG. 8 by dashed line 814.

In other embodiments, computing device 812 includes additional features or functionality. For example, computing device 812 may include additional storage such as removable storage or non-removable storage, including, but not limited to, magnetic storage, optical storage, etc. Such additional storage is illustrated in FIG. 8 by storage 820. In one or more embodiments, computer readable instructions to implement one or more embodiments provided herein are in storage 820. Storage 820 may store other computer readable instructions to implement an operating system, an application program, etc. Computer readable instructions may be loaded in memory 818 for execution by processing unit 816, for example.

The term "computer readable media" as used herein includes computer storage media. Computer storage media includes volatile and nonvolatile, removable and non-removable media implemented in any method or technology for storage of information such as computer readable instructions or other data. Memory 818 and storage 820 are examples of computer storage media. Computer storage media includes, but is not limited to, RAM, ROM, EEPROM, flash memory or other memory technology, CD-ROM, Digital Versatile Disks (DVDs) or other optical storage, magnetic cassettes, magnetic tape, magnetic disk storage or other magnetic storage devices, or any other medium which may be used to store the desired information and which may be accessed by computing device 812. Any such computer storage media is part of computing device 812.

The term "computer readable media" includes communication media. Communication media typically embodies computer readable instructions or other data in a "modulated data signal" such as a carrier wave or other transport mechanism and includes any information delivery media. The term "modulated data signal" includes a signal that has one or more of its characteristics set or changed in such a manner as to encode information in the signal.

Computing device 812 includes input device(s) 824 such as keyboard, mouse, pen, voice input device, touch input device, infrared cameras, video input devices, or any other input device. Output device(s) 822 such as one or more displays, speakers, printers, or any other output device may be included with computing device 812. Input device(s) 824 and output device(s) 822 may be connected to computing device 812 via a wired connection, wireless connection, or any combination thereof. In one or more embodiments, an input device or an output device from another computing device may be used as input device(s) 824 or output device(s) 822 for computing device 812. Computing device 812 may include communication connection(s) 826 to facilitate communications with one or more other devices.

Although the subject matter has been described in language specific to structural features or methodological acts, it is to be understood that the subject matter of the appended claims is not necessarily limited to the specific features or acts described above. Rather, the specific features and acts described above are disclosed as example embodiments.

Various operations of embodiments are provided herein. The order in which one or more or all of the operations are described should not be construed as to imply that these operations are necessarily order dependent. Alternative ordering will be appreciated based on this description. Further, not all operations may necessarily be present in each embodiment provided herein.

As used in this application, "or" is intended to mean an inclusive "or" rather than an exclusive "or". Further, an inclusive "or" may include any combination thereof (e.g., A, B, or any combination thereof). In addition, "a" and "an" as used in this application are generally construed to mean "one or more" unless specified otherwise or clear from context to be directed to a singular form. Additionally, at least one of A and B and/or the like generally means A or B or both A and B. Further, to the extent that "includes", "having", "has", "with", or variants thereof are used in either the detailed description or the claims, such terms are intended to be inclusive in a manner similar to the term "comprising".

Further, unless specified otherwise, "first", "second", or the like are not intended to imply a temporal aspect, a spatial aspect, an ordering, etc. Rather, such terms are merely used as identifiers, names, etc. for features, elements, items, etc. For example, a first channel and a second channel generally correspond to channel A and channel B or two different or two identical channels or the same channel. Additionally, "comprising", "comprises", "including", "includes", or the like generally means comprising or including, but not limited to.

It will be appreciated that various of the above-disclosed and other features and functions, or alternatives or varieties thereof, may be desirably combined into many other different systems or applications. Also that various presently unforeseen or unanticipated alternatives, modifications, variations or improvements therein may be subsequently made by those skilled in the art which are also intended to be encompassed by the following claims.

The invention claimed is:

1. A system for vehicle operation assistance comprising:
a processing unit; and
a memory, storing processor-executable instructions, which when executed by the processing unit, perform:
automatically transmitting a request for help based on an emergency status of an occupant of a vehicle;
receiving a "follow me" request from a potential leader vehicle in response to the request for help;
placing the system in a follower mode based on an acceptance of the "follow me" request received from the occupant of the vehicle via a vehicle interface by establishing a connection with the potential leader vehicle, wherein in follower mode the vehicle is a follower vehicle and the potential leader vehicle is a leader vehicle;
wirelessly receiving a navigation instruction from the leader vehicle; and
executing a driving maneuver in an autonomous fashion based on the navigation instruction from the leader vehicle,
wherein the processing unit transmits a request to the leader vehicle to wait for the follower vehicle based on an obstacle, and
wherein the processing unit places the system in an emergency mode and terminates the connection with the leader vehicle based on no response to the request to wait for the follower vehicle from the leader vehicle.

2. The system for vehicle operation assistance of claim 1, wherein the emergency status of the occupant of the vehicle is determined by the processing unit based on a body temperature, a pulse, a pulse rate, a respiration rate, a perspiration rate, a blood pressure, eye movement, body movement, head movement, or carbon dioxide output of the occupant of the vehicle.

3. The system for vehicle operation assistance of claim 1, wherein the emergency status of the occupant of the vehicle is determined by the processing unit based on an absence of operating actions from the occupant of the vehicle and an expected operating action.

4. The system for vehicle operation assistance of claim 1, wherein the processing unit initiates communication with a help center based on the emergency status of the occupant.

5. The system for vehicle operation assistance of claim 1, wherein the processing unit implements an emergency response action based on the emergency status of the occupant.

6. The system for vehicle operation assistance of claim 5, wherein the emergency response action includes automatically pulling the vehicle over via one or more automated driving maneuvers, automatically engaging hazard lights of the vehicle, or automatically navigating to a meeting location via one or more automated driving maneuvers.

7. The system for vehicle operation assistance of claim 1, wherein the connection between the follower vehicle and the leader vehicle is established based on vehicle to vehicle (V2V) communications, vehicle to motorcycle (V2M) communications, vehicle to cloud communications, dedicated short range communications (DSRC), or a cellular network.

8. The system for vehicle operation assistance of claim 1, wherein the processing unit transmits a location of the follower vehicle, a driving maneuver to be executed by the follower vehicle, an anticipated route, an anticipated destination, or a vehicle parameter of the follower vehicle to a third party.

9. The system for vehicle operation assistance of claim 8, wherein the third party or the processing unit of the follower vehicle generate a leader score for the leader vehicle based on the leader vehicle's interactions with the follower vehicle.

10. The system for vehicle operation assistance of claim 1, wherein the acceptance of the "follow me" request is based on a leader score associated with the leader vehicle indicative of the potential leader vehicle's previous interactions with other follower vehicles.

11. The system for vehicle operation assistance of claim 1, wherein there is a fee arrangement between the leader vehicle and the follower vehicle.

12. The system for vehicle operation assistance of claim 1, wherein the leader vehicle is equipped with another system for vehicle operation assistance.

13. A system for vehicle operation assistance comprising:
a processing unit; and
a memory, storing processor-executable instructions, which when executed by the processing unit, perform:
receiving a request for help based on an emergency status of an occupant of a potential follower vehicle;
transmitting a "follow me" request to the potential follower vehicle in response to the request for help;
placing the system in a leader mode based on an acceptance of the "follow me" request received from the occupant of the potential follower vehicle via a vehicle interface of the potential follower vehicle by establishing a connection with the potential follower vehicle, wherein in leader mode, a vehicle equipped with the system for vehicle operation assistance is a leader vehicle and the potential follower vehicle is a follower vehicle;
executing a driving maneuver and wirelessly transmitting a navigation instruction to the follower vehicle which causes execution of a corresponding driving maneuver on the follower vehicle in an autonomous fashion; and
wherein the connection with the follower vehicle is terminated based on a non-received request from the follower vehicle to wait.

14. The system for vehicle operation assistance of claim 13, wherein the follower vehicle is equipped with another system for vehicle operation assistance.

15. A method for vehicle operation assistance comprising:
automatically transmitting, using a transmitter, a request for help based on an emergency status of an occupant of a vehicle;
receiving, using a receiver, a "follow me" request from a potential leader vehicle in response to the request for help;
placing the vehicle in a follower mode, using a processing unit, based on an acceptance of the "follow me" request received via help center assistance by establishing a connection with the potential leader vehicle, wherein in follower mode the vehicle is a follower vehicle and the potential leader vehicle is a leader vehicle;
wirelessly receiving, using the receiver, a navigation instruction from the leader vehicle;
executing a driving maneuver in an autonomous fashion, using the processing unit, based on the navigation instruction from the leader vehicle;

transmitting a request to the leader vehicle to wait for the follower vehicle based on an obstacle; and placing the vehicle in an emergency mode and terminates the connection with the leader vehicle based on no response to the request to wait for the follower vehicle from the leader vehicle.

16. The method for vehicle operation assistance of claim 15, comprising determining, using the processing unit, the emergency status of the occupant of the vehicle based on a body temperature, a pulse, a pulse rate, a respiration rate, a perspiration rate, a blood pressure, eye movement, body movement, head movement, or carbon dioxide output of the occupant of the vehicle.

17. The method for vehicle operation assistance of claim 16, wherein the body temperature, the pulse, the pulse rate, the respiration rate, the perspiration rate, the blood pressure, the eye movement, the body movement, the head movement, or the carbon dioxide output of the occupant are detected by a sensor.

18. The method for vehicle operation assistance of claim 15, comprising determining, using the processing unit, the emergency status of the occupant of the vehicle based on an absence of operating actions from the occupant of the vehicle and an expected operating action.

* * * * *

UNITED STATES PATENT AND TRADEMARK OFFICE
CERTIFICATE OF CORRECTION

PATENT NO. : 10,657,825 B2
APPLICATION NO. : 15/973687
DATED : May 19, 2020
INVENTOR(S) : Kei Oshida et al.

Page 1 of 1

It is certified that error appears in the above-identified patent and that said Letters Patent is hereby corrected as shown below:

On the Title Page

Column 1, (72) city for Inventor Kei Oshida, reads: "Ustunomiya"; should read "Utsunomiya, Tochigi".

Address for Yoichi Sugimoto, reads: "Tochigi"; should read "Utsunomiya, Tochigi".

Signed and Sealed this
Eighth Day of September, 2020

Andrei Iancu
*Director of the United States Patent and Trademark Office*